(12) United States Patent
Goel et al.

(10) Patent No.: US 12,477,388 B1
(45) Date of Patent: Nov. 18, 2025

(54) SYSTEMS, METHODS, AND DEVICES FOR PACKET DROP PREVENTION WITH L4S

(71) Applicant: Apple Inc., Cupertino, CA (US)

(72) Inventors: Neha Goel, Oceanside, CA (US); Divyaprakash P. Bhojkumar, San Jose, CA (US); Muthukumaran Dhanapal, San Diego, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 18/668,075

(22) Filed: May 17, 2024

(51) Int. Cl.
*H04W 28/02* (2009.01)

(52) U.S. Cl.
CPC ... *H04W 28/0273* (2013.01); *H04W 28/0268* (2013.01); *H04W 28/0284* (2013.01)

(58) Field of Classification Search
None
See application file for complete search history.

(56) References Cited

U.S. PATENT DOCUMENTS

| | | | | |
|---|---|---|---|---|
| 2023/0344772 A1* | 10/2023 | Johansson | | H04L 47/30 |
| 2024/0104817 A1* | 3/2024 | Paczkowski | | H04W 28/0268 |
| 2024/0381171 A1* | 11/2024 | Vaidya | | H04W 28/0268 |
| 2025/0063388 A1* | 2/2025 | Taneja | | H04W 24/08 |
| 2025/0113243 A1* | 4/2025 | Kim | | H04W 28/0284 |
| 2025/0158926 A1* | 5/2025 | Zuniga | | H04L 47/29 |
| 2025/0159547 A1* | 5/2025 | Hart | | H04W 28/0289 |
| 2025/0202827 A1* | 6/2025 | Henry | | H04L 47/2441 |

OTHER PUBLICATIONS

ETSI TS 123 501 V18.5.0, 5G; System Architecture for the 5G System (5GS), 3GPP TS 23.501 version 18.5.0 Release 18, May 2024, 718 pages.

* cited by examiner

*Primary Examiner* — Backhean Tiv
(74) *Attorney, Agent, or Firm* — Kubota & Basol LLP

(57) ABSTRACT

Described herein are solutions for reducing packet loss for low latency, low loss, scalable throughput (LAS) traffic. A user equipment (UE) can determine whether a base station is capable of supporting LAS traffic and can implement rate adaptation in different ways based on the LAS capabilities of the base station and active queue management (AQM) policies of the base station. A base station can establish protocol data unit (PUD) sessions between the UE and different instances of a network slice based on whether the base station receives packets from applications capable of LS4 rate adaptation. These and many other features and examples are described in additional detail.

20 Claims, 13 Drawing Sheets

| APPLICATION | TRAFFIC / APP CLASS | APPLICATION L4S CAPABILITY | ROUTE SELECTION |
|---|---|---|---|
| LOW LATENCY APPLICATION 1 (3D VIDEO CALLING) | 6.9000 | YES | S-NSSAI-2, DNN = "LOW_LATENCY" |
| LOW LATENCY APPLICATION 2 (ONLINE VIDEO GAME) | 6.9000* | NO | S-NSSAI-2, DNN = "LOW_LATENCY" |
| NON-LOW LATENCY APPLICATION (INTERNET BROWSER) | *.2014 | NO | S-NSSAI-3, DNN = "STREAMING" |

*FIG. 8*

SYSTEMS, METHODS, AND DEVICES FOR PACKET DROP PREVENTION WITH L4S

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks can be developed to implement fourth generation (4G), fifth generation (5G) or new radio (NR) technology. Such technology can include solutions for enabling user equipment (UE) and network devices, such as base stations, to communicate with one another. Some scenarios can involve ensuring the reliability and efficiency of data transmissions.

BRIEF DESCRIPTION OF THE DRAWINGS

The present disclosure will be readily understood and enabled by the detailed description and accompanying figures of the drawings. Like reference numerals can designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and can mean at least one, one or more, etc.

FIG. 8 is a diagram of an example of a data structure for associating applications with LAS capabilities, L4S subscriptions, and traffic routes according to one or more implementations described herein.

DETAILED DESCRIPTION

Figure 1:
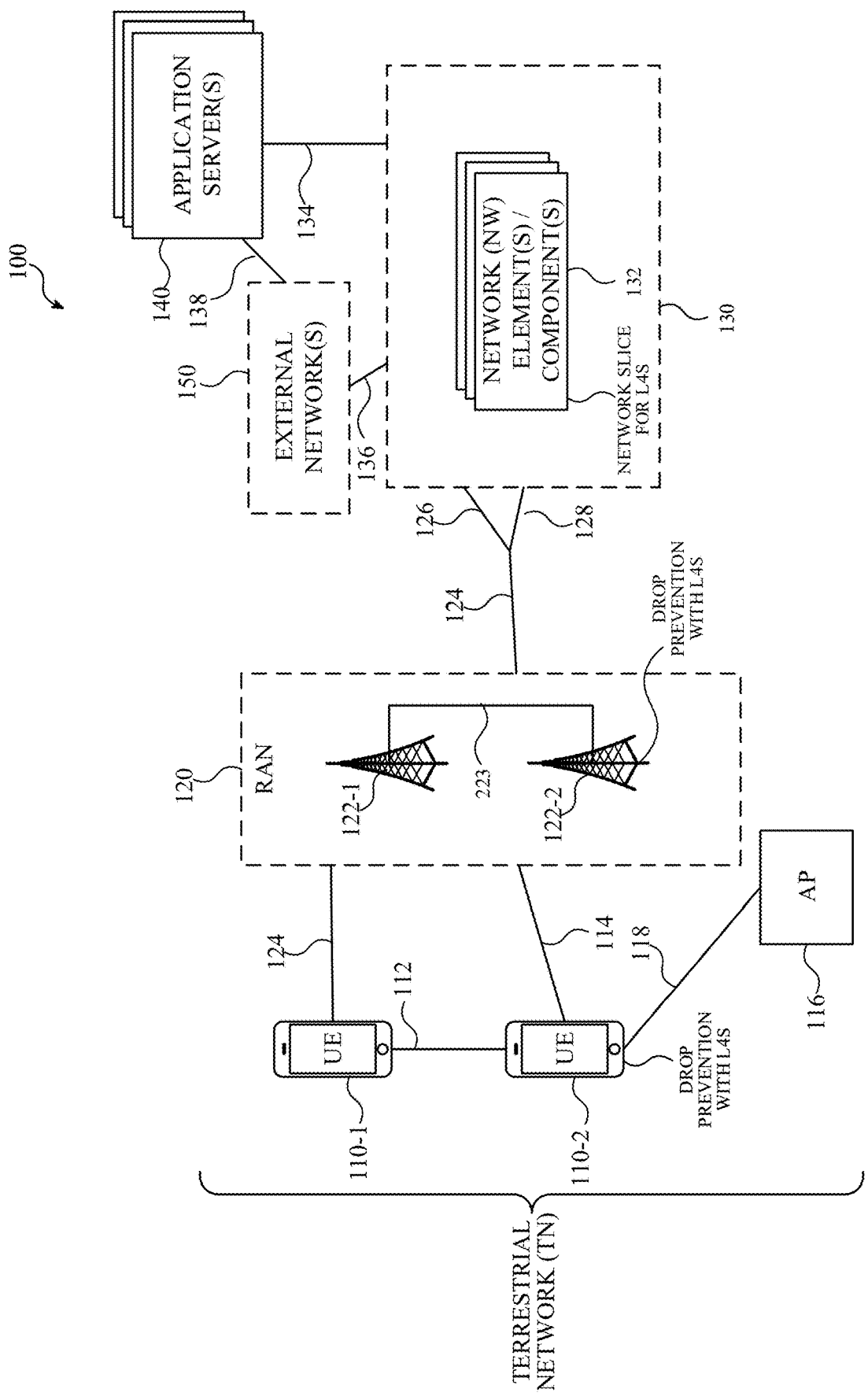
FIG. 1 is a diagram of an example network according to one or more implementations described herein.

The following detailed description refers to the accompanying drawings. Like reference numbers in different drawings can identify the same or similar features, elements, operations, etc. Additionally, the present disclosure is not limited to the following description as other implementations can be utilized, and structural or logical changes made, without departing from the scope of the present disclosure.

Telecommunication networks can include user equipment (UEs) capable of communicating with base stations and/or other network access nodes. UEs and base stations can implement various techniques and communications standards for enabling UEs and base stations to discover one another, establish and maintain connectivity, and exchange information in an ongoing manner. Objectives of such techniques can include ensuring that data flows and packets are transmitted and received efficiently and reliably.

UE can include application processors, baseband processors, and other components with queues or buffers for data flows. The data flows can include markings or indications of a quality of service (QOS) corresponding to the data flow. Higher priority or time-sensitive data flows can have a higher QoS indicator (QI), while lower priority or less-time-sensitive data flows can have lower QI. Applications or data flows referred to herein as low latency applications or low latency data flows can correspond to services with a high QoS (e.g., services requiring or preferring real-time or near real-time data flows). Examples of such applications can include video calling applications, video streaming applications, on-line gaming applications, and more.

Some low latency applications can be capable of low latency, low loss, scalable throughput (L4S), while other low latency applications are not capable of LAS. Data traffic for these applications can be referred to as LAS traffic and non-LAS traffic, respectively. L4S can refer to an ability of an application, UE, base station, and/or network device or function to adjust for latency and loss while maintaining throughput. L4S is generally designed to achieve this by addressing overfilled queues or buffers at the sending UE, implementing active queue management (AQM) at network bottlenecks, and using protocol features for data traffic identification.

Currently available technologies fail to provide any, or adequate, techniques for preventing packet loss for L4S data flows. For example, a UE can use the same queues and data radio bearers (DRBs) to transmit L4S and non-LAS traffic, and the base station and core network often apply the same queue management policy to the L4S and non-L4S traffic. The queue management policy can include the network applying the same queue, threshold, marking schemes, and responses to L4S and non-LAS traffic congestion.

When congestion is detected by the base station (e.g., because of queue overload), the base station marks the packets from both L4S and non-L4S traffic as congestion experienced (CE). This can cause a receiving UE to provide the sending UE with rate adaptation feedback for the L4S and non-LAS traffic. However, the sending UE only applies rate adaptation to the L4S traffic as the application producing the non-L4S traffic is incapable of rate adaptation. As a result, the queue implemented at the base station continues to overload because the non-LAS traffic is still generated at the same rate. When the base station determines that a latency of the L4S and non-LAS traffic exceeds a latency threshold, the base station starts dropping packets. As such, packets from L4S and non-LAS traffic are lost because the same queue management policy is applied to both types of traffic but only a rate of the LAS traffic can be adapted.

One or more of the techniques described herein provide solutions for reducing the packet loss for L4S traffic. Examples of these solutions can include enabling a UE to determine whether a base station is capable of supporting L4S traffic and being able to implement rate adaptation in different ways based on whether the base station supports L4S traffic and the AQM policy of the base station.

Other examples of these solutions can include enabling a base station to establish a PDU session between UE 110 and a core network that supports. When a packet is received by the base station, the base station can determine whether the packet is associated with an L4S application or a non-LAS application. For LAS applications, when the base station detects congestion above a congestion threshold, the base station can mark the packet as CE. This can cause a receiving UE to provide congestion feedback to the sending UE, and the sending UE can determine whether and how to apply rate adaptation.

For non-L4S applications, the base station can tear down the PDU session and establish a new PDU session that does not support LAS traffic. The UE and the base station can use the new PDU session for the non-LAS traffic. As such, the UE can reduce packet loss with LAS by adapting to base station L4S capabilities, and the base station can reduce packet loss for L4S traffic by ensuring that traffic is matched with an appropriate PDU session and network slice. These and many other features are described in additional detail with reference to the Figures that follow.

FIG. 1 is an example network 100 according to one or more implementations described herein. Example network 100 can include UEs 110, 110-2, etc. (referred to collectively as "UEs 110" and individually as "UE 110"), a radio access network (RAN) 120, a core network (CN) 130, application servers 140, and external networks 150.

The systems and devices of example network 100 can operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 can include smartphones (e.g., handheld touchscreen mobile computing devices connectable to one or more wireless communication networks). Additionally, or alternatively, UEs 110 can include other types of mobile or non-mobile computing devices capable of wireless communications, such as personal data assistants (PDAs), pagers, laptop computers, desktop computers, wireless handsets, etc. In some implementations, UEs 110 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data can be a machine-initiated exchange, and an IoT network can include interconnecting IoT UEs (which can include uniquely identifiable embedded computing devices within an Internet infrastructure) with short-lived connections. In some scenarios, IoT UEs can execute background applications (e.g., keep-alive messages, status updates, etc.) to facilitate the connections of the IoT network.

UEs 110 can communicate and establish a connection with one or more other UEs 110 via one or more wireless channels 112, each of which can comprise a physical communications interface/layer. The connection can include an M2M connection, MTC connection, D2D connection, SL connection, etc. The connection can involve a PC5 interface. In some implementations, UEs 110 can be configured to discover one another, negotiate wireless resources between one another, and establish connections between one another, without intervention or communications involving RAN node 122 or another type of network node. In some implementations, discovery, authentication, resource negotiation, registration, etc., can involve communications with RAN node 122 or another type of network node.

UEs 110 can use one or more wireless channels 112 to communicate with one another. As described herein, UE 110 can communicate with RAN node 122 to request SL resources. RAN node 122 can respond to the request by providing UE 110 with a dynamic grant (DG) or configured grant (CG) regarding SL resources. A DG can involve a grant based on a grant request from UE 110. A CG can involve a resource grant without a grant request and can be based on a type of service being provided (e.g., services that have strict timing or latency requirements). UE 110 can perform a clear channel assessment (CCA) procedure based on the DG or CG, select SL resources based on the CCA procedure and the DG or CG; and communicate with another UE 110 based on the SL resources. The UE 110 can communicate with RAN node 122 using a licensed frequency band and communicate with the other UE 110 using an unlicensed frequency band.

UEs 110 can communicate and establish a connection with (e.g., be communicatively coupled) RAN 120, which can involve one or more wireless channels 114-1 and 114-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes (e.g., 122-1 and 122-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 130. Additionally, at least one of the MN or the SN can be operated with shared spectrum channel access, and functions specified for UE 110 can be used for an integrated access and backhaul mobile termination (IAB-MT). Similar for UE 110, the IAB-MT can access the network using either one network node or using two different nodes with enhanced dual connectivity (EN-DC) architectures, new radio dual connectivity (NR-DC) architectures, or the like. In some implementations, a base station (as described herein) can be an example of network node 122.

As described herein, UE 110 can receive and store one or more configurations, instructions, and/or other information for enabling SL-U communications with quality and priority standards. A PQI can be determined and used to indicate a QoS associated with an SL-U communication (e.g., a channel, data flow, etc.). Similarly, an L1 priority value can be determined and used to indicate a priority of an SL-U transmission, SL-U channel, SL-U data, etc. The PQI and/or L1 priority value can be mapped to a CAPC value, and the PQI, L1 priority, and/or CAPC can indicate SL channel occupancy time (COT) sharing, maximum (MCOT), timing gaps for COT sharing, LBT configuration, traffic and channel priorities, and more.

As shown, UE 110 can also, or alternatively, connect to access point (AP) 116 via connection interface 118, which can include an air interface enabling UE 110 to communicatively couple with AP 116. AP 116 can comprise a wireless local area network (WLAN), WLAN node, WLAN termination point, etc. The connection 116 can comprise a local wireless connection, such as a connection consistent with any IEEE 702.11 protocol, and AP 116 can comprise a wireless fidelity (Wi-Fi®) router or other AP. While not explicitly depicted in FIG. 1, AP 116 can be connected to another network (e.g., the Internet) without connecting to RAN 120 or CN 130. In some scenarios, UE 110, RAN 120, and AP 116 can be configured to utilize LTE-WLAN aggregation (LWA) techniques or LTE WLAN radio level integration with IPsec tunnel (LWIP) techniques. LWA can involve UE 110 in RRC_CONNECTED being configured by RAN 120 to utilize radio resources of LTE and WLAN. LWIP can involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling can include encapsulating the entirety of original IP packets and adding a new packet header, thereby protecting the original header of the IP packets.

RAN 120 can include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 can include network access points configured to provide radio baseband functions for data and/or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 can include a roadside unit (RSU), a transmission reception point (TRxP or TRP), and one or more other types of ground stations (e.g., terrestrial access points). In some scenarios, RAN node 122 can be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 122, or portions thereof, can be implemented as one or more software entities running on server computers as part of a virtual network, which can be referred to as a centralized RAN (CRAN) and/or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 1 (L2) protocol entities can be operated by individual RAN nodes 122; a media access control (MAC)/physical (PHY) layer split wherein RRC, PDCP, radio link control (RLC), and MAC layers can be operated by the CRAN/vBBUP and the PHY layer can be operated by individual RAN nodes 122; or a "lower PHY" split wherein RRC, PDCP, RLC, MAC layers and upper portions of the PHY layer can be operated by the CRAN/vBBUP and lower portions of the PHY layer can be operated by individual RAN nodes 122. This virtualized framework can allow freed-up processor cores of RAN nodes 122 to perform or execute other virtualized applications.

In some implementations, an individual RAN node 122 can represent individual gNB-distributed units (DUs) connected to a gNB-control unit (CU) via individual F1 or other interfaces. In such implementations, the gNB-DUs can include one or more remote radio heads or radio frequency (RF) front end modules (RFEMs), and the gNB-CU can be operated by a server (not shown) located in RAN 120 or by a server pool (e.g., a group of servers configured to share resources) in a similar manner as the CRAN/vBBUP. Additionally, or alternatively, one or more of RAN nodes 122 can be next generation eNBs (i.e., gNBs) that can provide evolved universal terrestrial radio access (E-UTRA) user plane and control plane protocol terminations toward UEs 110, and that can be connected to a 5G core network (5GC) 130 via an NG interface.

Any of the RAN nodes 122 can terminate an air interface protocol and can be the first point of contact for UEs 110. In some implementations, any of the RAN nodes 122 can fulfill various logical functions for the RAN 120 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals can comprise a plurality of orthogonal subcarriers.

In some implementations, a downlink resource grid can be used for downlink transmissions from any of the RAN nodes 122 to UEs 110, and uplink transmissions can utilize similar techniques. The grid can be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block can comprise a collection of resource elements (REs); in the frequency domain, this can represent the smallest quantity of resources that currently can be allocated. There are several different physical downlink channels that are conveyed using such resource blocks.

Further, RAN nodes 122 can be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 can operate using stand-alone unlicensed operation, licensed assisted access (LAA), eLAA, and/or feLAA mechanisms. In these implementations, UEs 110 and the RAN nodes 122 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

The PDSCH can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110 within a cell) can be performed at any of the RAN nodes 122 based on channel quality information fed back from any of UEs 110. The downlink resource assignment information can be sent on the PDCCH used for (e.g., assigned to) each of UEs 110.

One or more of the techniques, described herein, can enable a reduction in packet loss for LAS traffic. UE 110 can determine whether a base station is capable of supporting L4S traffic and can implement rate adaptation in different ways based on the LAS capabilities of the base station and active queue management (AQM) policies of the base station. In another example, base station 122 can establish a PDU session between UE 110 and a core network that supports L4S. When a packet arrives, base station 122 can determine whether the packet comes from an LAS application or a non-L4S application. For L4S applications, when the base station detects congestion above a congestion threshold, the base station can mark the packet as CE. This can cause a receiving UE 110 to provide congestion feedback to the sending UE 110, and the sending UE 110 can determine whether and how to apply rate adaptation. For non-LAS applications, the base station can tear down the PDU session and establish a new PDU session over a different network slice (e.g., a network slice that does not support LAS traffic). UE 110 and the base station 122 can use the new PDU session for the non-LAS traffic. As such, UE 110 can reduce packet loss with L4S by adapting to base station L4S capabilities, and the base station 122 can reduce packet loss for LAS traffic by ensuring that traffic is matched with an appropriate PDU session and network slice. These and many other features and examples are described herein.

The RAN nodes 122 can be configured to communicate with one another via interface 123. In implementations where the system is an LTE system, interface 123 can be an X2 interface. In NR systems, interface 123 can be an Xn interface. The X2 interface can be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface can include an X2 user plane interface (X2-U) and an X2 control plane interface (X2-C). The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

As shown, RAN 120 can be connected (e.g., communicatively coupled) to CN 130. CN 130 can comprise a plurality of network elements 132, which are configured to offer various data and telecommunications services to customers/subscribers (e.g., users of UEs 110) who are connected to the CN 130 via the RAN 120. In some implementations, CN 130 can include an evolved packet core (EPC), a 5G CN, and/or one or more additional or alternative types of CNs. The components of the CN 130 can be implemented in one physical node or separate physical nodes including components to read and execute instructions from a machine-readable or computer-readable medium (e.g., a non-transitory machine-readable storage medium). In some implementations, network function virtualization (NFV) can be utilized to virtualize any or all the above-described network node roles or functions via executable instructions stored in one or more computer-readable storage mediums (described in further detail below). A logical instantiation of the CN 130 can be referred to as a network slice, and a logical instantiation of a portion of the CN 130 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, CN 130, application servers 140, and external networks 150 can be connected to one another via interfaces 134, 136, and 138, which can include IP network interfaces. Application servers 140 can include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application servers 140 can also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 can include one or more of a variety of networks, including the Internet, thereby providing the mobile communication network and UEs 110 of the network access to a variety of additional services, information, interconnectivity, and other network features.

Figure 2:
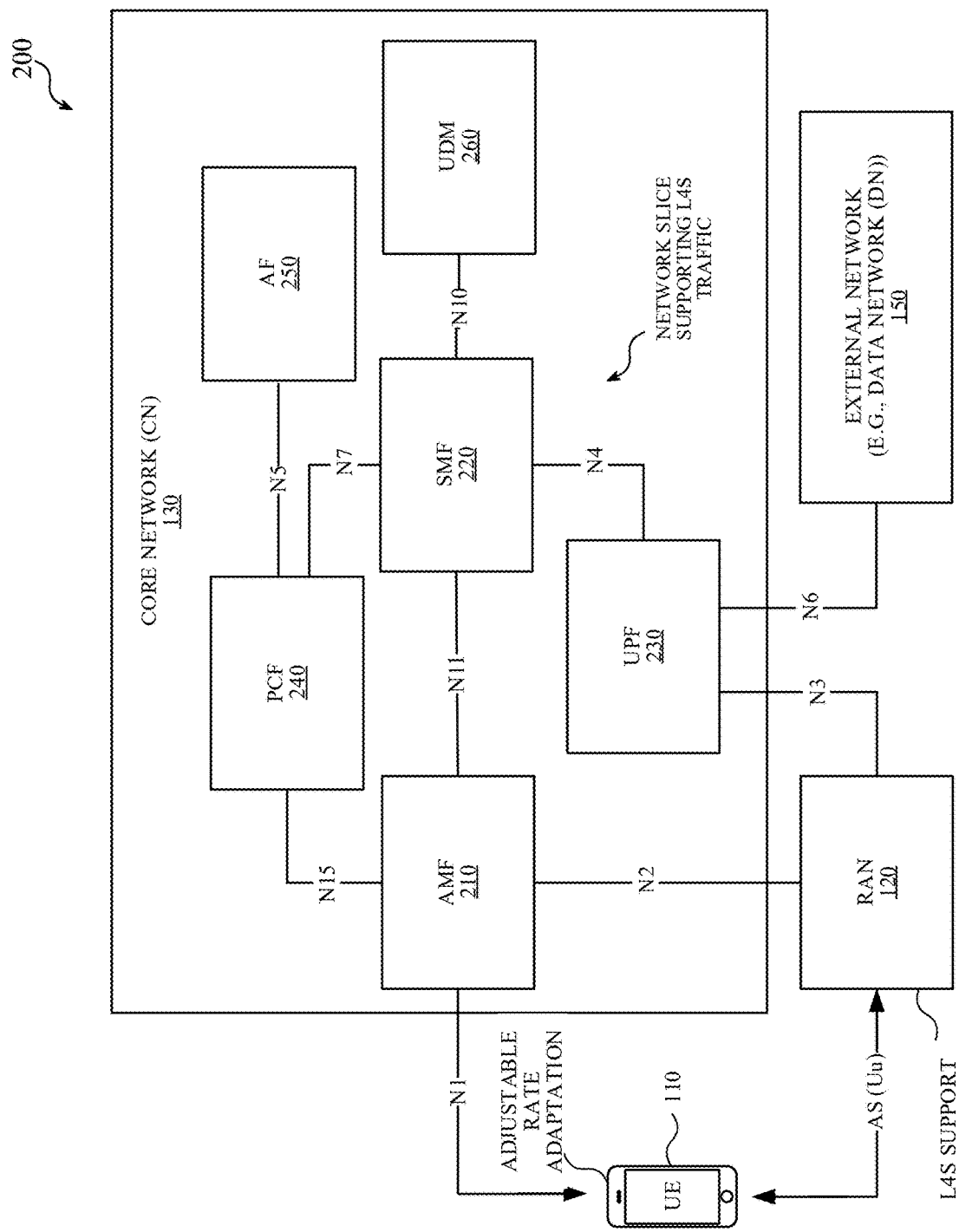
FIG. 2 is a diagram of an example core network (CN) according to one or more implementations described herein.

FIG. 2 is a diagram of an example network architecture 200 according to one or more implementations described herein. As shown, example network architecture 200 can include UE 110, RAN 120, CN 130, and external network 150. RAN 120 can include base station 122 and/or one or more other types of APs 116. CN 130 can include access and mobility management function (AMF) 210, session management function (SMF) 220, user plane function (UPF) 230), policy control function (PCF) 240, application function (AF) 250, and unified data management (UDM) node 260. AMF 210, SMF 220, UPF 230, PCF 240, AF 250, and UDM node 260 can be functions of CN 130 and can be implemented by one or more servers in a centralized or distributed networking environment, which can include one or more network virtualization functions (NVF). External network 150 can include a data network that includes one or more application servers, the Internet, another telecommunications network, and/or another type of network. In some implementations, example network architecture 200 can include one or more additional, alternative, and/or differently arranged functions, interfaces, or other features than those shown in FIG. 2.

AMF 210 can communicate with RAN 120 via an N2 interface and UE 110 via an N1 interface. AMF 210 can manage authentication, registration, and other functionalities relating to UEs 110 accessing a telecommunication mobile network. AMF 210 can manage handovers, paging, and other functionality regarding the mobility and communications of UEs 110. AMF 210 can also provide security functionality for authenticating and authorizing UEs 110. AMF 210 can communicate with SMF via an N11 interface, with PCF 240 via an N15 interface, and with UPF 240 via an N4 interface.

SMF 220 can provide PDU session management. To do so, SMF 220 can collect information related to managing a PDU session from various network components (e.g., UPF 230, PCF 240, AF 250, etc.) and control or orchestrate the network components based on a request from AMF 210. SMF 220 can be responsible for establishing, maintaining, and terminating user sessions in CN 130. SMF 220 can manage user plane (UP) resources and interact with UPF 230 to ensure that data packets are correctly routed and forwarded.

SMF 220 can receive PDU session establishment and/or session modification request from UE 110. The request can include an indication for assistance with a UL PDU set identification. The request can also indicate a real-time transport protocol (RTP) header extension and/or transport layer protocol corresponding to the requested assistance. SMF 220 can determine whether a protocol description, corresponding to the request, has been provided by PCF 240 and/or AF 250. The protocol description can include information about the RTP header extensions and/or other protocol features used by an application, and in turn, enable UE 110 to identify PDU sets from UL packets. The protocol description can also, or alternatively, include information about one or more other types of transport layer protocols and/or protocol features used by an application, such that UE 110 can identify PDU sets from UL packets based on how the application uses the transport layer protocol.

SMF 220 can include PDU set protocol descriptions, QoS profiles and parameters, quality flow identifiers (QFIs), and/or one or more additional or alternative types of information to, for example, enable UL PDU sets of a given application or service to be appropriately identified. For example, AF 250 can include protocol descriptions for different types of applications and services supported by the network, such as XR applications and/or XRM applications and services. The protocol descriptions can include information to enable UE 110, base stations 122, and other devices to identify PDU sets within a service data flow. SMF 220 can receive the protocol descriptions from AF 250 via PCF 240, and can provide the protocol descriptions to UE 110, RAN 120, UPF 230, and/or one or more of the devices or entities described herein. In some implementations, the protocol descriptions provided by SMF 220 can be based, at least in part, on rules received from PCF 240.

UPF 230 can communicate with RAN 120 via an N3 interface, PCF 240 via an N7 interface, and SMF 220 via an N11 interface, which can be routed through RAN 120. UPF 230 can operate as a point of connection for PDU sessions between RAN 120 and external data network 150 (e.g., the Internet, another telecommunication network, etc.) via interface N6. UPF 230 can also provide support for packet routing, forwarding, and inspection. UPF 230 can provide user plane rule enforcement, QoS handling, UL/DL rate enforcement, and service data flow (SDF) to QoS flow mapping. UPF 230 can communicate with SMF 220 via an N4 interface and with RAN 120 via an N3 interface.

PCF 240 can provide policy control and flow-based control functionalities. PCF 240 can include and provide policy charging and control (PCC) rules for applications, data flows, PDU sets, gating, QoS, etc., to SMF 220. PCF 240 can also provide access and mobility management policies to AMF 210. PCF 240 can communicate with SMF 220 via an N7 interface and with AMF 210 via an N15 interface.

UE 110 can send and receive information from RAN 120 via an access stratum (AS) interface. UE 110 can also send and receive PDU set information (e.g., protocol descriptions for PDU set information) from SMF 220. QoS flow profiles and PDU set protocol descriptions can also be configured from SMF 220 to RAN 120 and UE 110. Each QoS flow profile and/or PDU set protocol description can be associated with a set of QoS parameters that can be part of a QoS profile stored by RAN 120 and updated by AMF 210. Examples of QoS parameters can include a resource type, packet delay budget (PDB), quality flow identifier (QFI), packet error rate (PER), averaging window, and more. AMF 210 can provide UE 110 with QoS rules during a PDU session via a non-access stratum (NAS) protocol or interface.

AF 250 can include a network function configured to manage traffic and QoS assignments, through interaction with the policy elements. AF 250 can expose an application layer for interaction with 5G network functions (NFs) and network resources. AF 250 can reside in a control plane of a 5G service-based architecture (SBA), and AF 250 can function to access a network repository function (NEF) for retrieving resources, interacting with PCF 240 via an N5 interface, enabling policy control, traffic routing for applications, and providing application services to subscribers.

UDM node 260 can manage subscription-related information to support the handling of communication sessions. UDM node 260 can store subscription data of UE 110, which can be communicated between the UDM node 260 and the AMF 210 via an N8 interface (not shown). UDM node 260 can communicate with SFM 220 via an N10 interface. UDM node 260 can include two parts, an application functional entity (FE) and a unified data repository (UDR). The UDR can store subscription data and policy data for UDM node 260 and PCF 240, and/or structured data for exposure and application data (including packet flow descriptions (PFDs) for application detection and requested information). UDM node 260 can include a UDM-FE, which can process credentials, perform location management, subscription management, and so on. The UDM-FE can also access subscription information stored in the UDR and perform authentication credential processing, user identification handling, access authorization, registration/mobility management, and subscription management.

Network architecture 200 can implement network slicing to enhance the performance of network functions and procedures. For example, network slicing can leverage software-defined networking (SDN) techniques, network function virtualization (NFV) techniques, etc., to use the physical network infrastructure (e.g., physical components of UE 110, RAN 120, etc.) to create multiple, virtual instances of a network scenario corresponding to a target network procedure and causing each network slice to perform different portions of the network procedure (e.g., multiplexing), such that optimized performance of the procedure is achieved as results from each portion are combined or otherwise processed (e.g., demultiplexed) amounting to the completion of the procedure as a whole. Accordingly, in some scenarios, network slicing can include a network architecture and technique that can enable device and/or network performance enhancement or optimization by using the physical infrastructure resources to create multiple, logical instances of a given network scenario, and causing different portions of a network process, function, or procedure to be performed by the different instance of the network scenario.

Each network slice can be an independent, end-to-end 5G network (which can be logical or physical). Each network slice can span across multiple or all network functions and can be isolated from other slices. Several of the components and functions of FIG. 2 can have specific behaviors related to network slice configuration. For example, UDM 260 can store a subscription for a user (e.g., of UE 110), for example, whether the user has purchased a subscription to a high-definition (HD) streaming slice. PCF 240 can provide rules to UE 110 to identify which traffic to send via which slice. AMF 210 can function as a single point of contact of UE 110 for slice-related configurations. UE 110 can set up slice-specific sessions, and route packets on the appropriate slice(s). The independence of network slices can allow for customization of RAN 120 and/or CN 130 configurations per network slice. From an AS perspective, slice traffic can be part of a separate DRB. From a NAS perspective, slice traffic can be part of separate PDU sessions.

Network architecture 200 can implement network slice selection assistance information (NSSAI) and single NSSAI (S-NSSAI) to enable efficient and dynamic network slicing. NSSAI can include a set of parameters used to identify and describe a network slice. Examples of these parameters can include a slice differentiator (SD) that can be a globally unique identifier and a slice service type (SST) that can indicate a specific service or application type associated with a network slice.

S-NSSAI can be an extension of NSSAI, specifically designed to support single network slice selection. S-NSSAI can provide additional information to assist UE 110 and the network in selecting the most suitable network slice based on the context and requirements of the communication session. S-NSSAI can involve one or more NSSAIs, each containing an SD and SST pair. Multiple NSSAIs can be included to represent a set of available network slices or to provide fallback options if the primary slice is not available. When UE 110 initiates a connection with a 5G network, UE 110 can include S-NSSAI information in the initial signaling message (e.g., registration request). The S-NSSAI can reflect desired network slice preferences. The network can match the S-NSSAI with an available network slice instance and selects the most appropriate slice that satisfies one or more corresponding requirements. The selection process can consider one or more factors, such as network resources, QoS policies, and network conditions. S-NSSAI can also be involved in dynamically switching between network slices.

Figure 3:
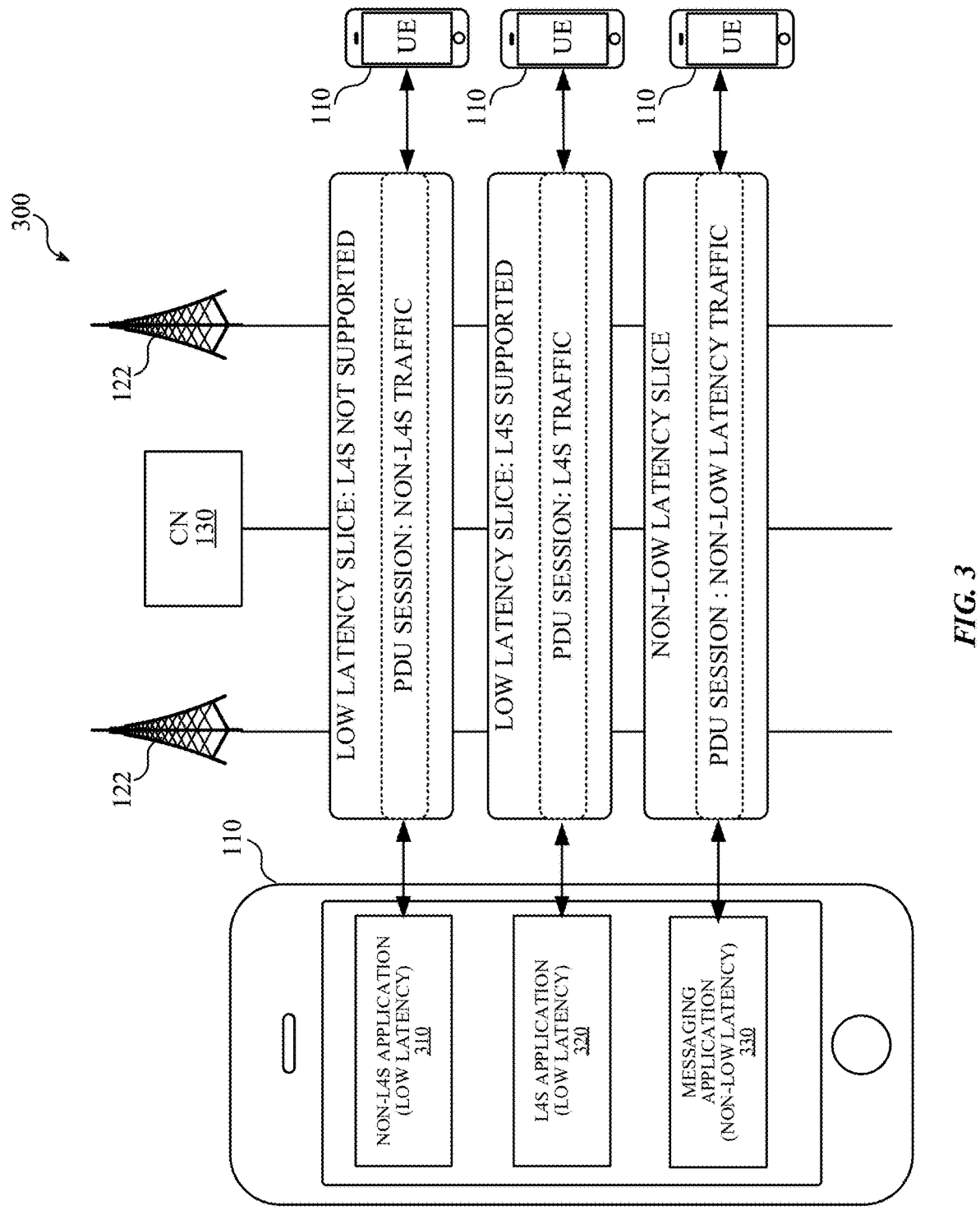
FIG. 3 is a diagram of an example framework for protocol data unit (PDU) sessions for low latency, low loss, scalable throughput (L4S) traffic and non-LAS traffic according to one or more implementations described herein

FIG. 3 is a diagram of an example framework 300 for protocol data unit (PDU) sessions for low latency, low loss, scalable throughput (LAS) traffic and non-LAS traffic according to one or more implementations described herein. As shown, example framework 300 can include UEs 110, base stations 122, and one or more CNs 130. UE 110 can include non-L4S application 310, L4S application 320, and messaging application 330. Non-L4S application 310 and L4S application 320 can include low latency applications (e.g., applications requiring or preferring real-time or near real-time latencies in order to operate as intended). Messaging application 330 can include a non-low latency application, such as a text messaging application, which does not require a real-time latency to perform properly.

Additionally, example framework 300 can be implemented using fewer, additional, and/or alternative devices, applications, and/or networks, and/or an arrangement of such than what is shown in FIG. 3. For example, in some implementations, two UEs 110 can communicate with one another using multiple applications over multipole networks, including multipole telecommunication networks and/or a data network (DN) (not shown). Similarly, UE 110 can implement multiple kinds of non-LAS applications 310, L4S applications 320, and/or messaging application 330, and/or different compositions of applications than what is shown in FIG. 3.

Non-L4S application 310 and L4S application 320 can each be configured to communicate with another UE 110 via PDU sessions of low latency network slices. The PDU session and network slice for non-L4S application 310 can be a PDU session and network slice that does not support L4S. The PDU session and network slice for non-L4S application 310 can be a PDU session and network slice that supports LAS (e.g., by implementing operations for measuring and monitory latency, market packets when latency occurs, changing the size of packet buffers or queues, changing thresholds for buffers or queues, and so on.).

The PDU session and network slice for LAS application 320 can be associated with a lower latency and higher QoS than the latency tolerance and QoS associated with the non-LAS application. In some implementations the latency and QoS can be for the same for the PDU sessions and network slices for non-L4S application 310 and LAS application 320. The PDU session and network slice for L4S application 320 can be associated with a low latency and high QoS relative to, for example the PDU session and network slice for messaging application 330.

Data flows of packets generated by non-LAS application 310, L4S application 320, and messaging application 330 can each correspond to a QoS indicated by a QI. The QI can be a scalar value used by base station 122 and CN 130 as reference to specific QoS forwarding behavior. Different parameters such as packet error rate, packet delay budget, and more, can be provided to a QoS flow (also referred to here as traffic, data flow, etc. QoS flow can either be a guaranteed bit rate (GBR) flow or a non-GBR flow based on based on a QoS profile associated with the QI. The QoS profile of QoS flow can be transmitted to base station 120. Each QoS flow can use the QoS profile based QoS parameters which include a 5QI and allocation and retention priority (ARP). Each non-GBR QOS flow can also include reflective QoS Attribute (RQA) parameter. Each GBR QoS flow can include A guaranteed flow bit rate (GFBR) and maximum flow bit rate (MFBR) for uplink (UL) and downlink (DL) traffic. QoS parameters can be included in GBR QoS flow viz. notification control and maximum packet loss rate (UL and DL).

Figure 4:
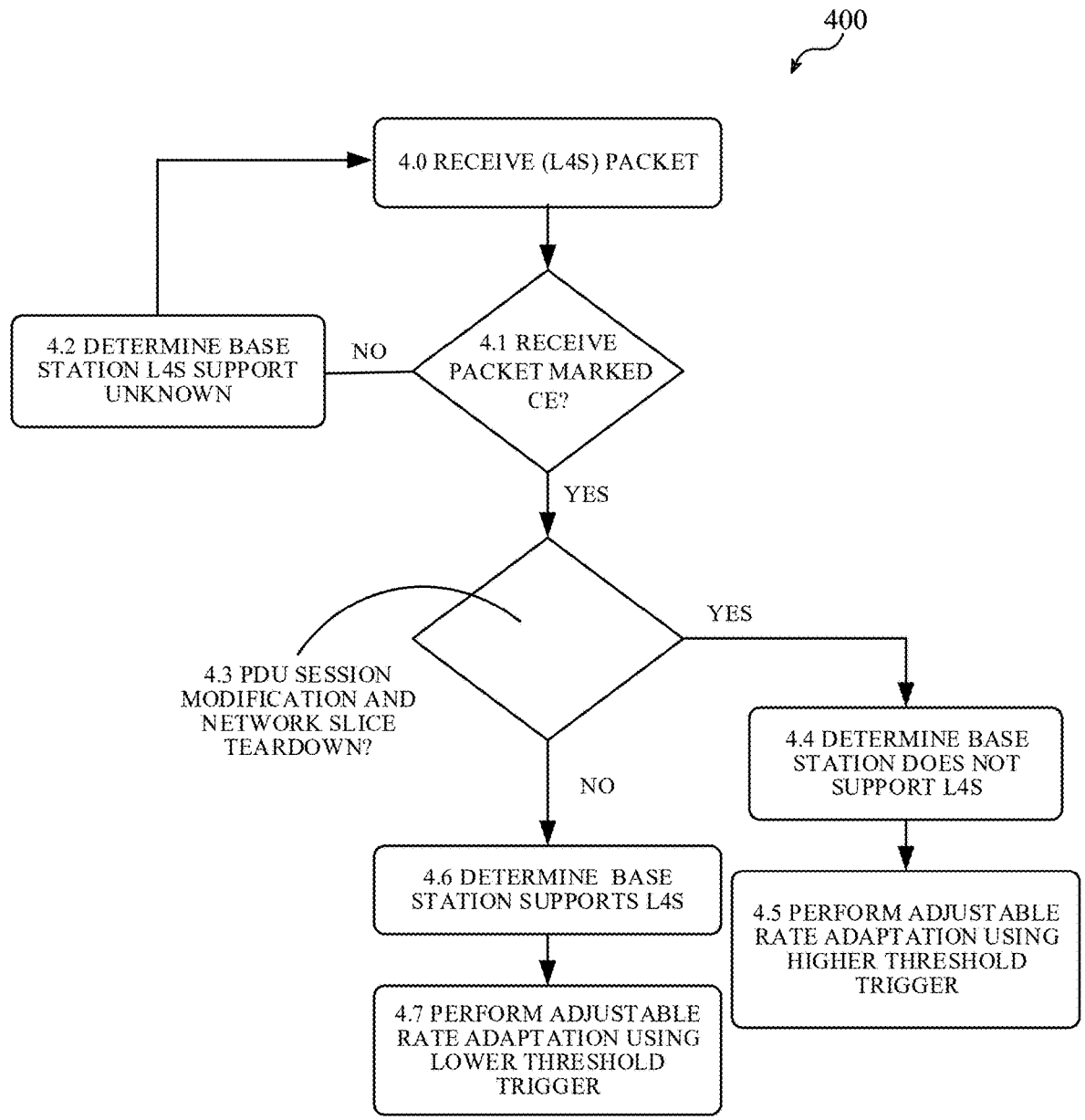
FIG. 4 is a diagram of an example of a process for adjustable rate adaptation of L4S traffic according to one or more implementations described herein.

FIG. 4 is a diagram of an example of a process 400 for adjustable rate adaptation of L4S traffic according to one or more implementations described herein. Process 400 can be implemented by UE 110 and one or more base stations 122. In some implementations, some or all of process 400 can be performed by one or more other systems or devices, including one or more of the devices of FIG. 1. Additionally, process 400 can include one or more fewer, additional, differently ordered and/or arranged operations than those shown in FIG. 4. In some implementations, some or all of the operations of process 400 can be performed independently, successively, simultaneously, etc., of one or more of the other operations of process 400. As such, the techniques described herein are not limited to a number, sequence, arrangement, timing, etc., of the operations or processes depicted in FIG. 4.

As shown, process 400 can include receiving an LAS packet (at 4.0). For example, UE 110 can receive an IP packet from base station 122. UE 120 can inspect the packet to determine whether the packet is an LAS packet or a non-L4S packet. UE 120 can determine this based on an explicit congestion notification (ECN) capable transport (ECT) value (e.g., 1 or 0). The ECT value can be included in a packet header. ECT(1) can indicate that LAS is supported. non-ECT (1) can indicate that L4S is not supported.

Process 400 can include determining whether the packet is marked as CE (at 4.1). For example, UE 110 can inspect the packet to determine whether the packet includes a CE marketing. When the packet is from sending UE 110 configured to support LAS, or the packet was received by base station 120 or another type of network device that supports LAS, the UE 110 or network device can mark the packet as CE in response to the device detecting a latency that is greater than a latency threshold. The latency can be measured based on the amount of time that the packet spends in a queue or buffer of the sending UE 110 or network device (e.g., how long the packet is in a queue for matching the packet with a DRB).

When a received packet does not include a CE marking (at 4.1—No), process 400 can include determining that a status about the base station supporting L4S is unknown (at 4.2). For example, when UE 110 receives a packet from base station 120 and the packet has not been marked as CE, UE 110 can acknowledge that it is unknown or unconfirmed whether base station 120 supports LAS. In response, UE 110 can In response, UE 110 can wait to receive and inspect another packet (at 4.1). In some implementations, UE 110 can instead receive a notification from base station 122 of a PDU session modification with 5QI teardown (see, block 7.7 of FIG. 7).

When a received packet is marked as CE (at 4.1—Yes), process 400 can include determining whether UE 110 has received an indication of a PDU session modification and network slice teardown from base station 120 (at 4.3). For example, when UE 110 receives a packet from base station 120 and the packet is marked as CE, UE 110 can determine whether UE 110 has received an indication of a PDU session modification and network slice teardown from base station 120.

When an indication of a PDU session modification and network slice teardown has been received (at 4.3—Yes), process 400 can include determining that base station 120 does not support L4S (at 4.4). For example, when UE 120 receives a packet marked as CE and has received an indication of a PDU session modification and network slice teardown, UE 120 can determine that base station 120 does not support L4S. In some implementations, the PDU session modification and network slice teardown can before a data flow of the received packet or another data flow (e.g., the data flow of another application). The PDU session modification and network slice teardown can indicate that base station 122 has received a non-L4S packet and is therefore modifying or creating a new PDU session and network slice for a data flow of the non-L4S packet.

Process 400 can also include performing adjustable rate adaptational using a higher threshold trigger (at 4.5). For example, when base station 120 does not support L4S, UE 110 can implement rate adaptation using a higher threshold trigger. The threshold trigger can include a threshold latency that is reached or exceeded before UE 110 (e.g., an application processor, baseband circuitry, or other component) applies L4S rate adaptation to a corresponding data flow. Applying a trigger in the form of a higher threshold latency can delay the application of L4S rate adaptation in the event that another data flow (e.g., from a non-LAS application) is contributing to the congestion.

When an indication of a PDU session modification and network slice teardown has not been received (at 4.3—No), process 400 can include determining that base station 120 supports LAS (at 4.6). For example, when UE 120 receives a packet marked as CE and does not receive an indication of a PDU session modification and network slice teardown, UE 120 can determine that base station 120 supports L4S. Process 400 can also include performing or applying adjustable rate adaptation using a lower threshold trigger (at 4.7). For example, when base station 120 supports L4S, UE 110 can implement rate adaptation using a lower threshold trigger than when the base station 122 does not support L4S. The threshold trigger can include a threshold latency or delay that is reached or exceeded before UE 110 (e.g., an application processor, baseband circuitry, or other component) applies LAS rate adaptation to a corresponding data flow. Applying a trigger in the form of a lower threshold latency can provide earlier access to the benefits of LAS via rate adjustment, whether the rate adjustment is applied at the UE 110, base station 120, and/or CN.

Figure 5:
FIG. 5 is a diagram of an example of a data structure for associating applications with a quality of service (QOS) and traffic route according to one or more implementations described herein.

FIG. 5 is a diagram of an example of a data structure 500 for associating applications with a QoS and traffic route according to one or more implementations described herein. As shown, example data structure 500 can include a table that includes an application column, a 5QI column, and a route selection column. The application column can include a name, type, category, or other indicating information about an application or class or type of application. As shown, example data structure 500 includes low latency application 1 (e.g., a 3D voice calling application), low latency application 2 (e.g., an online video gaming application), and a non-low latency application (e.g., a data streaming application).

The 5QI column can include a 5QI value configured to indicate whether a corresponding network slice is designated or reserved for L4S traffic. In some implementations, a 5QI of 80 or 130 can be used to indicate that a route (e.g., a PDU session and/or network slice) supports LAS traffic. The route selection column can include information identifying a PDU session and/or network slice associated with an application of the corresponding application column or a 5QI value of the corresponding 5QI column.

UE 110 can match a 5QI of a particular application with a value of the 5QI column and determine an appropriate route (e.g., LAS or non-LAS) for communicating packets of the data flow. As a non-limiting example, UE 110 can determine that a 3 dimensional (3D) video calling application is associated with 5QI 80 or 130 and is therefore to be routed to a low latency PDU session and network slice associated with S-NSSAI-2 and DNN. UE 110 can do likewise for the online gaming application of example data structure 500. By contrast, UE 110 can determine that a data streaming application is associated with 5QI 7, 8, or 9, and is therefore to be routed to a non-low latency PDU session and/or network slice associated with S-NSSAI-3 and DNN. While not shown, example data structure 500 can include an entry for low latency applications that are not capable of LAS, such that data flows for such applications are routed to a PDU session and/or network slice identified by, for example, S-NSSAI-1 and DNN.

Figure 6:
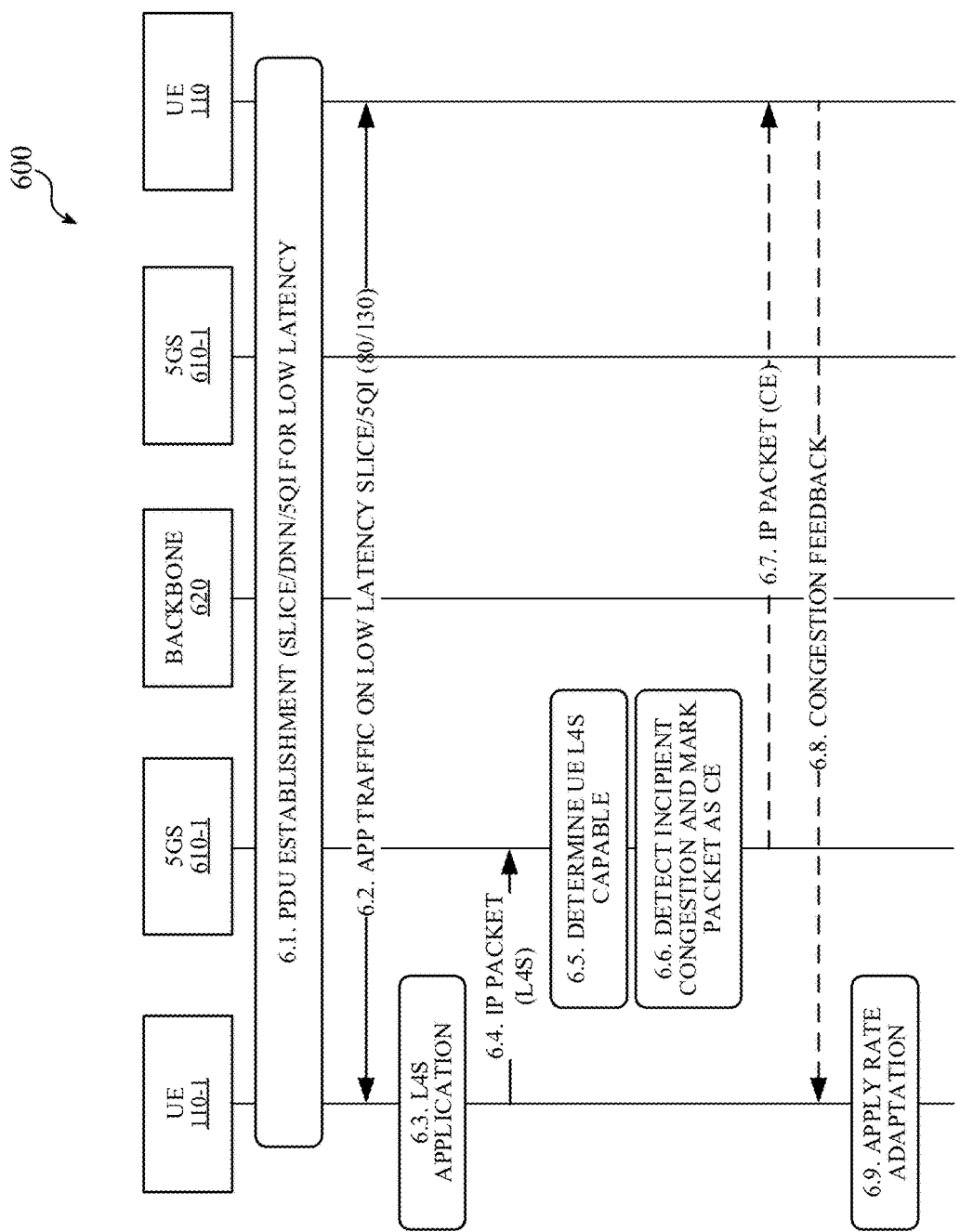
FIG. 6 is a diagram of an example of a process for managing L4S traffic according to one or more implementations described herein.

FIG. 6 is a diagram of an example of a process 600 for managing LAS traffic according to one or more implementations described herein. Process 600 can be implemented by UEs 110-1 and 110-2, 5GS 610-1 and 610-2, and backbone 620. 5GS 610-1 and 610-2 can each include a RAN 120 (e.g., base station 122) and CN 130. Backbone 620 can include a network backbone connecting 5GS 610-1 and 610-2. In some implementations, some or all of process 600 can be performed by one or more other systems or devices. Additionally, process 600 can include one or more fewer, additional, differently ordered and/or arranged operations than those shown in FIG. 6. In some implementations, some or all of the operations of process 600 can be performed independently, successively, simultaneously, etc., of one or more of the other operations of process 600. As such, the techniques described herein are not limited to a number, sequence, arrangement, timing, etc., of the operations or processes depicted in FIG. 6. In some implementations, process 600 and 700 of FIGS. 6-7 can be implemented by the same set of systems, networks, and devices.

As shown, UEs 110-1 and 110-2, 5GS 610-1 and 610-2, and backbone 620 can operate to establish a PDU session to enable communications between UEs 110 (at 6.1). The PDU session can include a low latency communication session established over a low latency network slice configured to support LAS. UEs 110 can use the PDU session to communicate L4S application traffic over the low latency network slice (e.g., a 5QI 80 network slice, a 5QI 130 network slice, etc.) (at 6.2). The PDU session and network slice can be dedicated of configured for L4S traffic. While not shown, UE 110-1 can route the LAS traffic to the PDU session and low latency network slice by mapping a QoS of the application to a 5QI associated with an appropriate S-NSSAI and DNN.

Process 600 can include UE 110-1 initiating an application that is capable of L4S (at 6.3). UE 110-1 can communicate an IP packet to 5GS 610-1 (at 6.4). The IP packet can include an indication that the packet supports L4S or that the packet is associated with an application that supports L4S. Base station 122, or other device or function of 5GS 610-1, can receive the IP packet and determine that UE 110-1 is capable of supporting L4S and or that the application to which the IP packet corresponds is capable of L4S. For example, the packet can include an ECT value in a packet header. An ECT value of 1 (e.g., ECT(1)) can indicate L4S capability. An ECT value of 0 (e.g., ECT(0)) can indicate a lack of L4S capability.

Process 600 can include base station 122, or other device or function of 5GS 610-1, monitoring a data flow associated with the packet and determining or detecting an incipient or actual congestion scenario (at 6.6). Base station 122 can do so by applying a measured latency to a latency threshold that corresponds to L4S data flows. In response, base station 600 can also mark the packet as CE to indicate congestion (at 6.6).

Process 600 can include base station 600 forwarding the packet to UE 110-2 (at 6.7). UE 110-2 can receive the packet, and in reasons to the CE mark, determine a latency corresponding to the packet. Process 600 can include UE 110-1 generating and providing congestion feedback to UE 110-1 (at 6.8). The congestion feedback can include CE being indicated in the packet and/or latency information measured and determined by UE 110-2. Process 600 can include UE 110-1 receiving the congestion feedback, and based on the congestion feedback, apply rate adaptation to a data stream of the packet experiencing latency and congestion (at 6.9). This can include determining an appropriate data flow rate based on a measured latency and adjusting a current data flow rate of the L4S application to the appropriate data flow rate.

Figure 7:
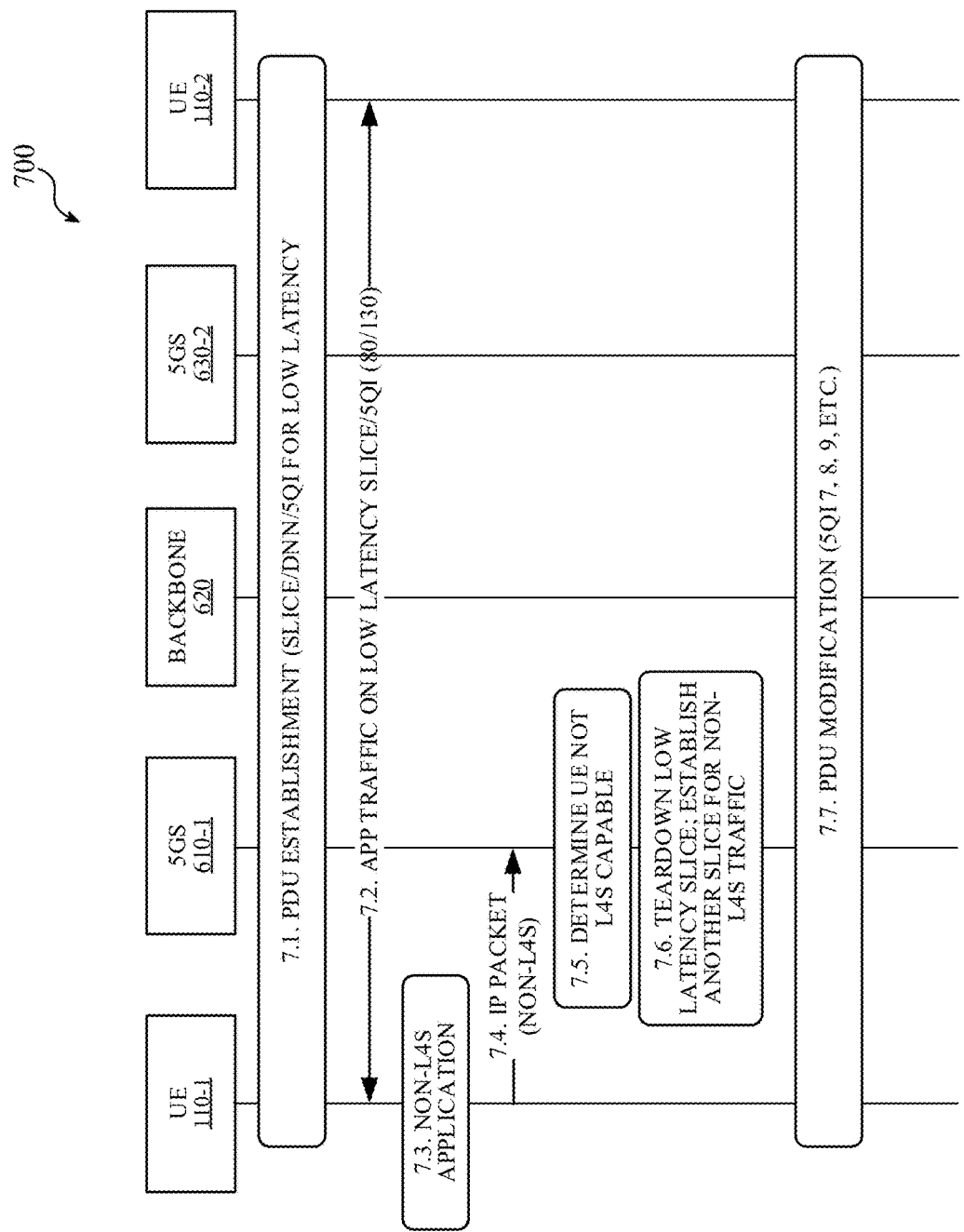
FIG. 7 is a diagram of an example of a process for managing L4S traffic according to one or more implementations described herein.

FIG. 7 is a diagram of an example of a process 700 for managing LAS traffic according to one or more implementations described herein. Process 700 can be implemented by UEs 110-1 and 110-2, 5GS 610-1 and 610-2, and backbone 620, which are described above. In some implementations, some or all of process 700 can be performed by one or more other systems or devices. Additionally, process 700 can include one or more fewer, additional, differently ordered and/or arranged operations than those shown in FIG. 7. In some implementations, some or all of the operations of process 700 can be performed independently, successively, simultaneously, etc., of one or more of the other operations of process 700. As such, the techniques described herein are not limited to the number, sequence, arrangement, timing, etc., of the operations or processes depicted in FIG. 7. In some implementations, process 600 and 700 of FIGS. 6-7 can be implemented by the same set of systems, networks, and devices.

As shown, UEs 110-1 and 110-2, 5GS 610-1 and 610-2, and backbone 620 can operate to establish a PDU session to enable communications between UEs 110 (at 7.1). The PDU session can include a low latency communication session established over a low latency network slice configured to support L4S. UEs 110 can use the PDU session to communicate L4S application traffic over the low latency network slice (e.g., a 5QI 80 network slice, a 5QI 130 network slice, etc.) (at 7.2). The PDU session and network slice can be dedicated of configured for LAS traffic. While not shown, UE 110-1 can route the LAS traffic to the PDU session and low latency network slice by mapping a QoS of the application to a 5QI associated with an appropriate S-NSSAI and DNN.

Process 700 can include UE 110-1 initiating an application that is not capable of L4S (at 7.3). UE 110-1 can communicate an IP packet of the non-L4S application to 5GS 610-1 (at 7.4). The IP packet can include an indication that the packet does not support LAS or that the packet is associated with an application that does not support L4S. Base station 122, or other device or function of 5GS 610-1, can receive the IP packet and determine that UE 110-1 is not capable of supporting L4S and or that the application to which the IP packet corresponds is not capable of L4S. For example, the packet can include an ECT value in a packet header. An ECT value of 1 (e.g., ECT(1)) can indicate L4S capability. An ECT value of 0 (e.g., ECT(0)) can indicate a lack of L4S capability.

Process 700 can include 5GS 610-1 tearing down the low latency slice and establishing another network slice for non-LAS traffic (at 7.6). The new network slice can be a low latency network slice or a non-low latency slice. Base station 122 can determine what type of network slice to establish based on the packet not being a LAS packet and/or a QoS (e.g., 5QI) associated with the packet. Process 700 can also include performing PDU modification for the data flow associated with the packet. Base station 122 can communicate with one or more functions of the new network slice to establish a new PDU session or modify the previous PDU session. Base station 122 and/or the CN functions of 5GS 610-1 and the functions and devices of 5GS-2 can establish the new PDU session in accordance with a 5QI associated with the packet (e.g., a 5QI of 7, 8, 9, etc.). While not shown, base stations 122 5GS 610-1 and 5GS 610-2 can inform UEs 110-1 and 110-2 of the new or modified PDU session, such that the non-LAS applications of UEs 110-1 and 110-2 can communicate with one another.

FIG. 8 is a diagram of an example of a data structure 800 for associating applications with LAS capabilities, LAS subscriptions, and traffic routes according to one or more implementations described herein. As shown, example data structure 800 can include a table that includes an application column, a traffic/application class column, an application LAS capability column, and a route selection column. UEs 110, base stations 122, and/or one or more functions of FIGS. 1-2) can use example data structure 800 to determine a traffic/application class of an application or application class; whether the application is capable of LAS; and a specified or dedicated PDU session and/or network slice for a data flow of the application.

The application column can include a name, type, category, or other indicating information about an application or class or type of application. As shown, example data structure 800 includes low latency application 1 (e.g., a 3D voice calling application), low latency application 2 (e.g., an online video gaming application), and a non-low latency application (e.g., an Internet browser application).

The traffic/application class column can include an indication of a class or type of data traffic and/or a class or type of application. As shown, low latency application 1 is associated with traffic/application class of 6.9000. Low latency application 2 is associated with traffic/application class of 6.9000*; and non-low latency application is associated with traffic/application class of *0.2014. The value of the traffic/application class can be a general numeric representation for traffic class and application class. The * of values 6.9000* and *0.2014 can represent an unknown value that can be specified in a particular scenario or implementation. The value can, for example, be beneficial for further differentiation within the application class and/or traffic class.

The application LAS capability column can indicate whether a corresponding application or class or type of application is capable of L4S. The route selection column can include an indication of an S-NSSAI and DNN associated with an application, traffic/application class and/or application LAS capability. For example, each S-NSSAI and DNN pair can be used to determine an appropriate network slice, PDU session, and other information for properly routing the data flow of a corresponding application. As a non-limiting example, UE 110, base station 122, etc., can use example data structure 800 to determine that a data flows for a 3D video calling application and an online video game are each to be routed according to S-NSSAI-2 and DNN for "Low_Latency" throughput and performance. By contrast, UE 110, base station 122, etc., can use example data structure 800 to determine that a data flow for an Internet browser application is to be routed according to S-NSSAI-2 and DNN for "STREAMING" throughput and performance.

Figure 9:
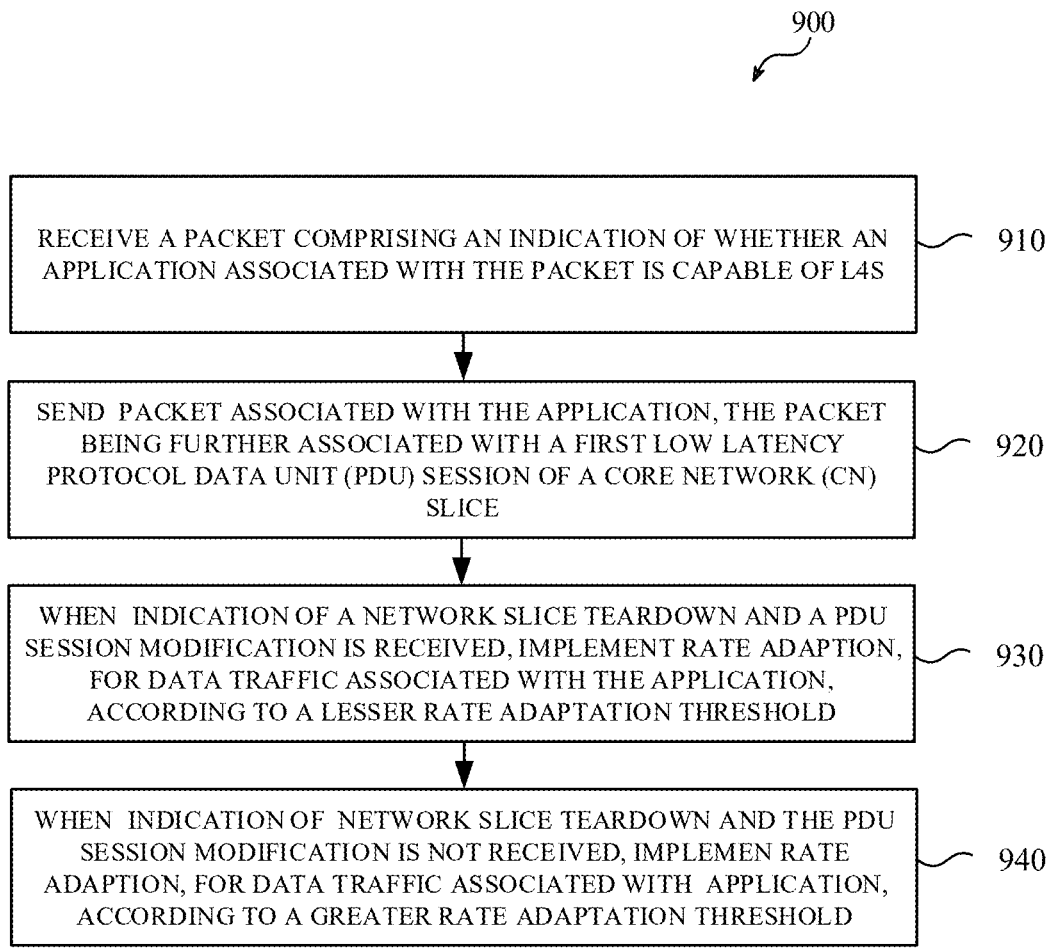
FIG. 9 is a diagram of an example process for packet drop prevention according to one or more implementations described herein.

FIG. 9 is a diagram of an example process 900 for packet drop prevention according to one or more implementations described herein. Process 900 can be implemented by UE 110 and/or one or more components thereof. In some implementations, some or all of process 900 can be performed by one or more other systems or devices, including one or more of the devices of FIG. 1. Additionally, process 900 can include one or more fewer, additional, differently ordered and/or arranged operations than those shown in FIG. 9. In some implementations, some or all of the operations of process 900 can be performed independently, successively, simultaneously, etc., of one or more of the other operations of process 900. As such, the techniques described herein are not limited to the number, sequence, arrangement, timing, etc., of the operations or processes depicted in FIG. 9.

As shown, 900 can include receiving, via an interface with an application processor, a packet comprising an indication of whether an application associated with the packet is capable of low latency, low loss, scalable throughput (L4S) (block 910). Process 900 can also include sending, via an interface with radio frequency (RF) circuitry, the packet associated with the application, the packet being further associated with a first low latency protocol data unit (PDU) session of a core network (CN) slice (block 920). Process 900 can also include when an indication of a network slice teardown and a PDU session modification is received, implementing rate adaption, for data traffic associated with the application, according to a lesser rate adaptation threshold (block 930). Process 900 can also include when the indication of the network slice teardown and the PDU session modification is not received, implementing rate adaption, for data traffic associated with the application, according to a greater rate adaptation threshold (block 940).

Figure 10:
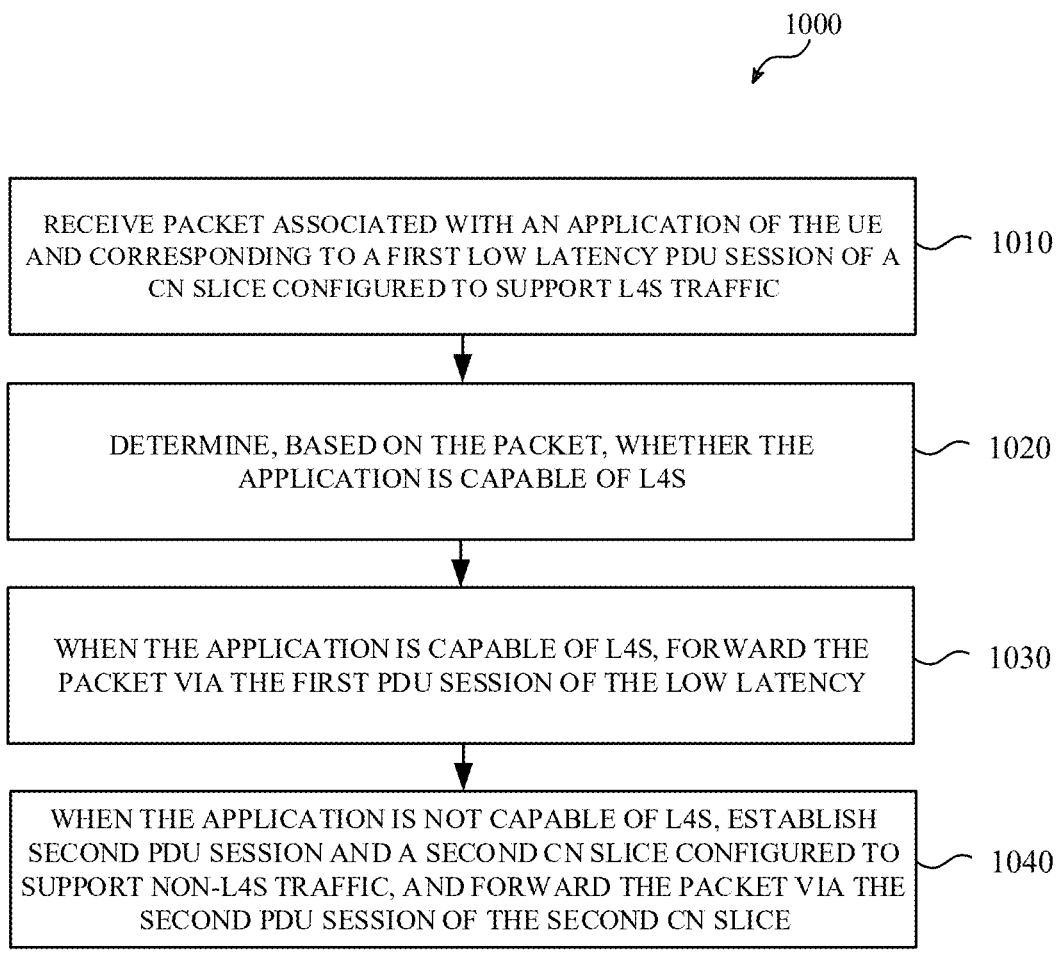
FIG. 10 is a diagram of an example process for packet drop prevention according to one or more implementations described herein.

FIG. 10 is a diagram of an example process for packet drop prevention according to one or more implementations described herein. Process 1000 can be implemented by base stations 122. In some implementations, some or all of process 1000 can be performed by one or more other systems or devices, including one or more of the devices of FIG. 1. Additionally, process 1000 can include one or more fewer, additional, differently ordered and/or arranged operations than those shown in FIG. 10. In some implementations, some or all of the operations of process 1000 can be performed independently, successively, simultaneously, etc., of one or more of the other operations of process 1000. As such, the techniques described herein are not limited to the number, sequence, arrangement, timing, etc., of the operations or processes depicted in FIG. 10.

As shown, process 1000 can include receiving, from a user equipment (UE), a packet associated with an application of the UE and corresponding to a first low latency protocol data unit (PDU) session of a first slice configured to support low latency, low loss, scalable throughput (LAS) traffic (block 1010). Process 1000 can also include determining, based on the packet, whether the application is capable of L4S (block 1020). Process 1000 can also include when the application is capable of L4S, forwarding the packet via the first PDU session of the low latency (block 1030). Process 1000 can also include when the application is not capable of L4S, establishing second PDU session and a second slice configured to support non-LAS traffic, and forwarding the packet via the second PDU session of the second slice (block 1040).

Figure 11:
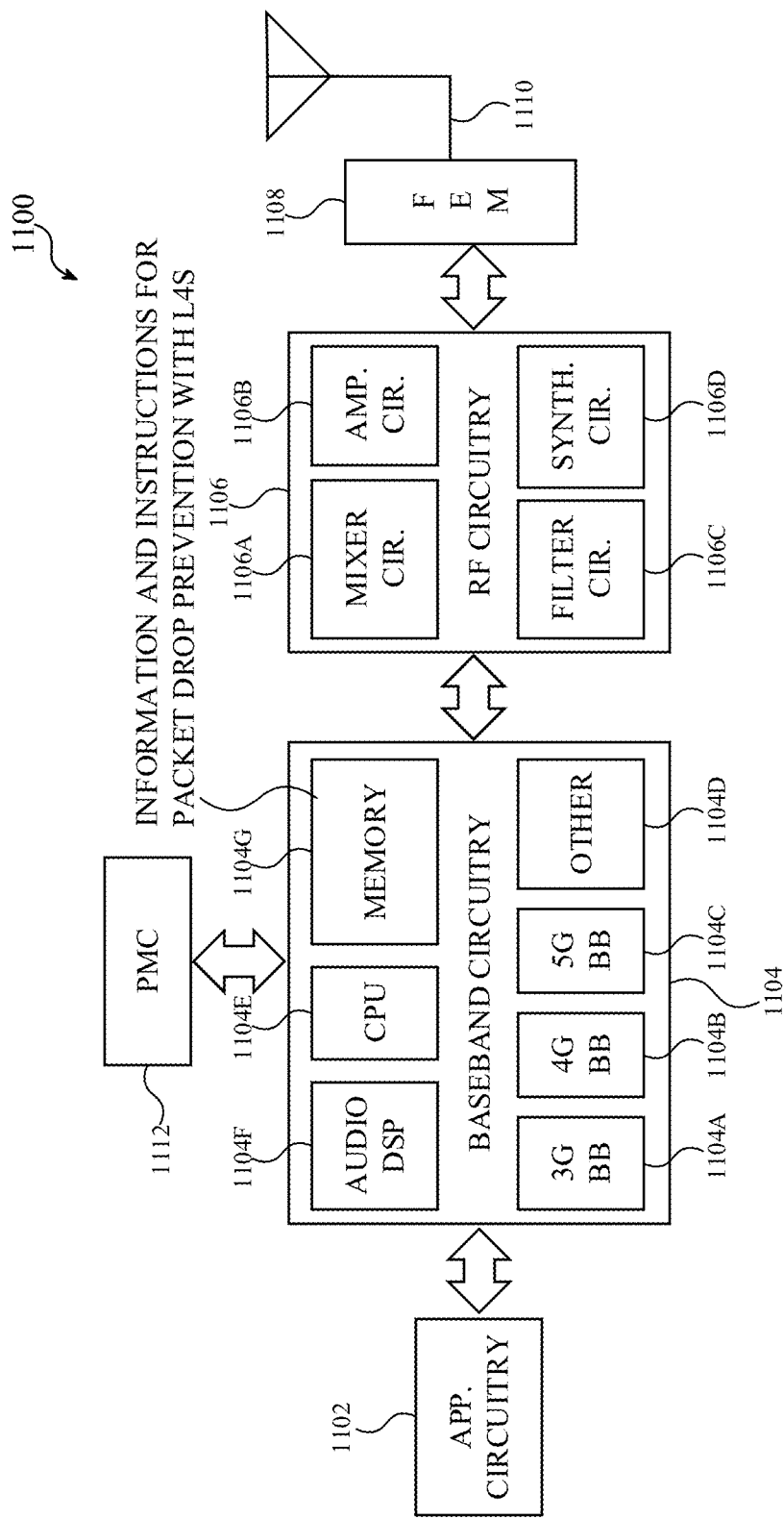
FIG. 11 is a diagram of an example of components of a device according to one or more implementations described herein.

FIG. 11 is a diagram of an example of components of a device according to one or more implementations described herein. In some implementations, the device 1100 can include application circuitry 1102, baseband circuitry 1104, RF circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some implementations, the device 1100 can include fewer elements (e.g., a RAN node may not utilize application circuitry 1102, and instead include a processor/controller to process IP data received from a CN or an Evolved Packet Core (EPC)). In some implementations, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other implementations, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some implementations, processors of application circuitry 1102 can process IP data packets received from an EPC.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some implementations, the baseband circuitry 1104 can include a 3G baseband processor 1104A, a 4G baseband processor 1104B, a 5G baseband processor 1104C, or other baseband processor(s) 1104D for other existing generations, generations in development or to be developed in the future (e.g., 5G, 6G, etc.). The baseband circuitry 1104 (e.g., one or more of baseband processors 1104A-D) can handle various radio control functions that enable communication with one or more radio networks via the RF circuitry 1106. In other implementations, some or all of the functionality of baseband processors 1104A-D can be included in modules stored in the memory 1104G and executed via a Central Processing Unit (CPU) 1104E. The radio control functions can include, but are not limited to, signal modulation/demodulation, encoding/decoding, radio frequency shifting, etc. In some implementations, modulation/demodulation circuitry of the baseband circuitry 1104 can include Fast-Fourier Transform (FFT), precoding, or constellation mapping/de-mapping functionality. In some implementations, encoding/decoding circuitry of the baseband circuitry 1104 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1104G can receive and/or store information and instructions for enabling UE 110, and/or one or more components thereof, to enable a reduction in packet loss for L4S traffic. UE 110 can determine whether a base station is capable of supporting LAS traffic and can implement rate adaptation in different ways based on the L4S capabilities of the base station and active queue management (AQM) policies of the base station. In another example, base station 122 can establish a PDU session between UE 110 and a core network that supports L4S. When a packet arrives, base station 122 can determine whether the packet comes from an LAS application or a non-LAS application. For L4S applications, when the base station detects congestion above a congestion threshold, the base station can mark the packet as CE. This can cause a receiving UE 110 to provide congestion feedback to the sending UE 110, and the sending UE 110 can determine whether and how to apply rate adaptation. For non-LAS applications, the base station can tear down the PDU session and establish a new PDU session over a different network slice (e.g., a network slice that does not support LAS traffic). UE 110 and the base station 122 can use the new PDU session for the non-LAS traffic. As such, UE 110 can reduce packet loss with L4S by adapting to base station LAS capabilities, and the base station 122 can reduce packet loss for L4S traffic by ensuring that traffic is matched with an appropriate PDU session and network slice. These and many other features and examples are described herein.

In some implementations, the baseband circuitry 1104 can include one or more audio digital signal processor(s) (DSP) 1104F. The audio DSPs 1104F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1104 and the application circuitry 1102 can be implemented together such as, for example, on a system on a chip (SOC).

In some implementations, the baseband circuitry 1104 can provide for communication compatible with one or more radio technologies. For example, in some implementations, the baseband circuitry 1104 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various implementations, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some implementations, the receive signal path of the RF circuitry 1106 can include mixer circuitry 1106A, amplifier circuitry 1106B and filter circuitry 1106C. In some implementations, the transmit signal path of the RF circuitry 1106 can include filter circuitry 1106C and mixer circuitry 1106A. RF circuitry 1106 can also include synthesizer circuitry 1106D for synthesizing a frequency for use by the mixer circuitry 1106A of the receive signal path and the transmit signal path. In some implementations, the mixer circuitry 1106A of the receive signal path can be configured to down-convert RF signals received from the FEM circuitry 1108 based on the synthesized frequency provided by synthesizer circuitry 1106D. The amplifier circuitry 1106B can be configured to amplify the down-converted signals and the filter circuitry 1106C can be a low-pass filter (LPF) or band-pass filter (BPF) configured to remove unwanted signals from the down-converted signals to generate output baseband signals. Output baseband signals can be provided to the baseband circuitry 1104 for further processing. In some implementations, the output baseband signals can be zero-frequency baseband signals, although this is not a requirement. In some implementations, mixer circuitry 1106A of the receive signal path can comprise passive mixers, although the scope of the implementations is not limited in this respect.

In some implementations, the mixer circuitry 1106A of the transmit signal path can be configured to up-convert input baseband signals based on the synthesized frequency provided by the synthesizer circuitry 1106D to generate RF output signals for the FEM circuitry 1108. The baseband signals can be provided by the baseband circuitry 1104 and can be filtered by filter circuitry 1106C.

In some implementations, the mixer circuitry 1106A of the receive signal path and the mixer circuitry 1106A of the transmit signal path can include two or more mixers and can be arranged for quadrature down conversion and up conversion, respectively. In some implementations, the mixer circuitry 1106A of the receive signal path and the mixer circuitry 1106A of the transmit signal path can include two or more mixers and can be arranged for image rejection (e.g., Hartley image rejection). In some implementations, the mixer circuitry 1106A of the receive signal path and the mixer circuitry 1406A can be arranged for direct down conversion and direct up conversion, respectively. In some implementations, the mixer circuitry 1106A of the receive signal path and the mixer circuitry 1106A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1106 can include analog-to-digital converter (ADC) and digital-to-analog converter (DAC) circuitry and the baseband circuitry 1104 can include a digital baseband interface to communicate with the RF circuitry 1106.

In some dual-mode implementations, a separate radio IC circuitry can be provided for processing signals for each spectrum, although the scope of the implementations is not limited in this respect.

In some implementations, the synthesizer circuitry 1106D can be a fractional-N synthesizer or a fractional N/N+1 synthesizer, although the scope of the implementations is not limited in this respect as other types of frequency synthesizers can be suitable. For example, synthesizer circuitry 1106D can be a delta-sigma synthesizer, a frequency multiplier, or a synthesizer comprising a phase-locked loop with a frequency divider.

The synthesizer circuitry 1106D can be configured to synthesize an output frequency for use by the mixer circuitry 1106A of the RF circuitry 1106 based on a frequency input and a divider control input. In some implementations, the synthesizer circuitry 1106D can be a fractional N/N+1 synthesizer.

In some implementations, frequency input can be provided by a voltage-controlled oscillator (VCO), although that is not a requirement. Divider control input can be provided by either the baseband circuitry 1104 or the applications circuitry 1102 depending on the desired output frequency. In some implementations, a divider control input (e.g., N) can be determined from a look-up table based on a channel indicated by the applications circuitry 1102.

Synthesizer circuitry 1106D of the RF circuitry 1106 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1106D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1106 can include an IQ/polar converter.

FEM circuitry 1108 can include a receive signal path which can include circuitry configured to operate on RF signals received from one or more antennas 1110, amplify the received signals and provide the amplified versions of the received signals to the RF circuitry 1106 for further processing. FEM circuitry 1108 can also include a transmit signal path which can include circuitry configured to amplify signals for transmission provided by the RF circuitry 1106 for transmission by one or more of the one or more antennas 1110. In various implementations, the amplification through the transmit or receive signal paths can be done solely in the RF circuitry 1106, solely in the FEM circuitry 1108, or in both the RF circuitry 1106 and the FEM circuitry 1108.

In some implementations, the FEM circuitry 1108 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1106). The transmit signal path of the FEM circuitry 1108 can include a power amplifier (PA) to amplify input RF signals (e.g., provided by RF circuitry 1106), and one or more filters to generate RF signals for subsequent transmission (e.g., by one or more of the one or more antennas 1110).

In some implementations, the PMC 1112 can manage power provided to the baseband circuitry 1104. In particular, the PMC 1112 can control power-source selection, voltage scaling, battery charging, or DC-to-DC conversion. The PMC 1112 can often be included when the device 1100 is capable of being powered by a battery, for example, when the device is included in a UE. The PMC 1112 can increase the power conversion efficiency while providing desirable implementation size and heat dissipation characteristics.

While FIG. 11 shows the PMC 1112 coupled only with the baseband circuitry 1104. However, in other implementations, the PMC 1112 can be additionally or alternatively coupled with, and perform similar power management operations for, other components such as, but not limited to, application circuitry 1102, RF circuitry 1106, or FEM circuitry 1108.

In some implementations, the PMC 1112 can control, or otherwise be part of, various power saving mechanisms of the device 1100. For example, if the device 1100 is in an RRC_Connected state, where it is still connected to the RAN node as it expects to receive traffic shortly, then it can enter a state known as Discontinuous Reception Mode (DRX) after a period of inactivity. During this state, the device 1100 can power down for brief intervals of time and thus save power.

If there is no data traffic activity for an extended period of time, then the device 1100 can transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1102 and processors of the baseband circuitry 1104 can be used to execute elements of one or more instances of a protocol stack. For example, processors of the baseband circuitry 1104, alone or in combination, can be used execute Layer 3, Layer 1, or Layer 1 functionality, while processors of the baseband circuitry 1104 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 1 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 12:
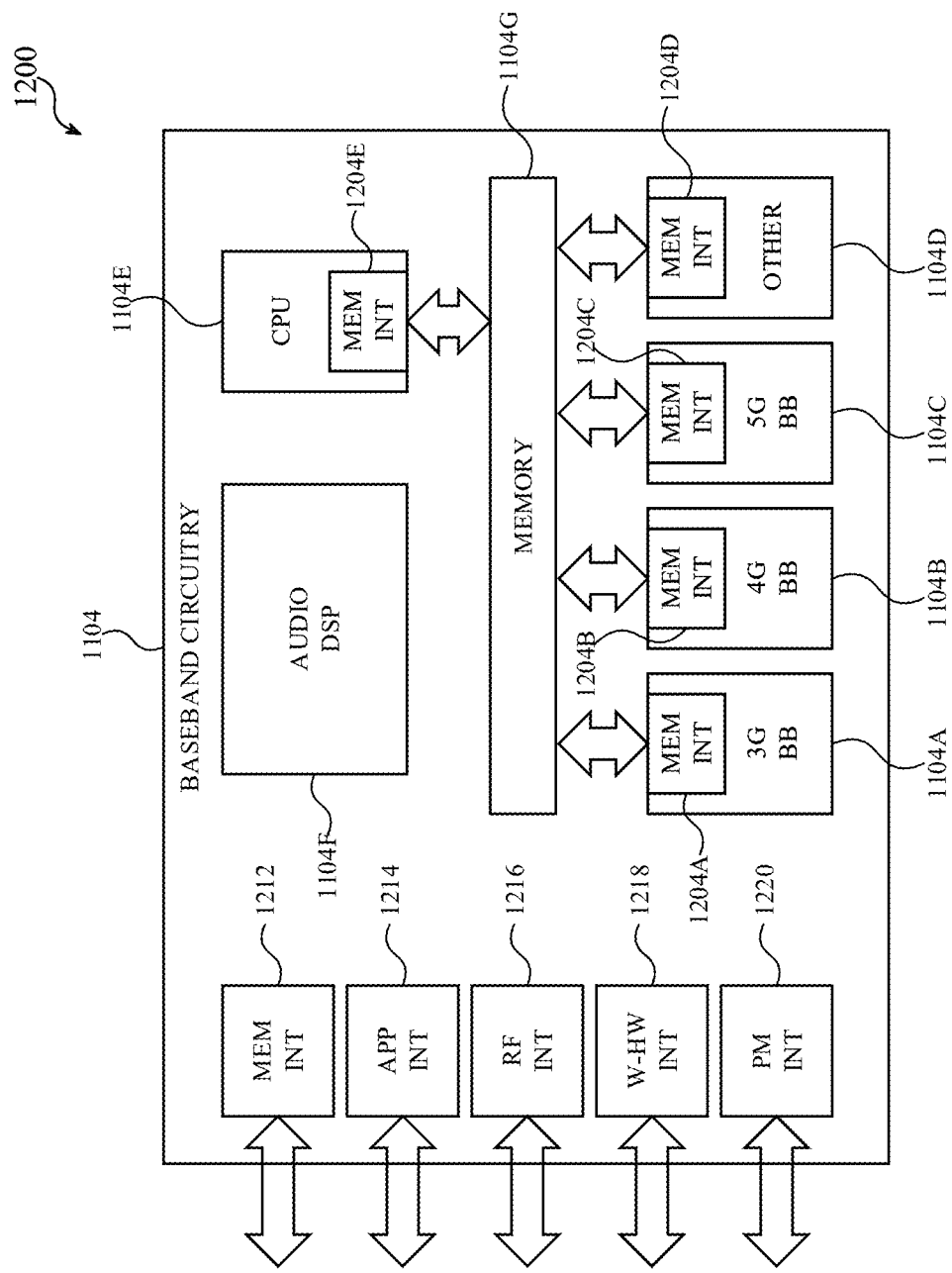
FIG. 12 is a diagram of example interfaces of baseband circuitry according to one or more implementations described herein.

FIG. 12 is a diagram of example interfaces 1200 of baseband circuitry according to one or more implementations described herein. As discussed above, the baseband circuitry 1104 of FIG. 11 can comprise processors 1104A through 1104E and a memory 1104G utilized by said processors. Each of the processors 1104A through 1104E can include a memory interface, 1204A through 1204E, respectively, to send/receive data to/from the memory 1104G.

The baseband circuitry 1104 can further include one or more interfaces to communicatively couple to other circuitries/devices, such as a memory interface 1112 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112).

Figure 13:
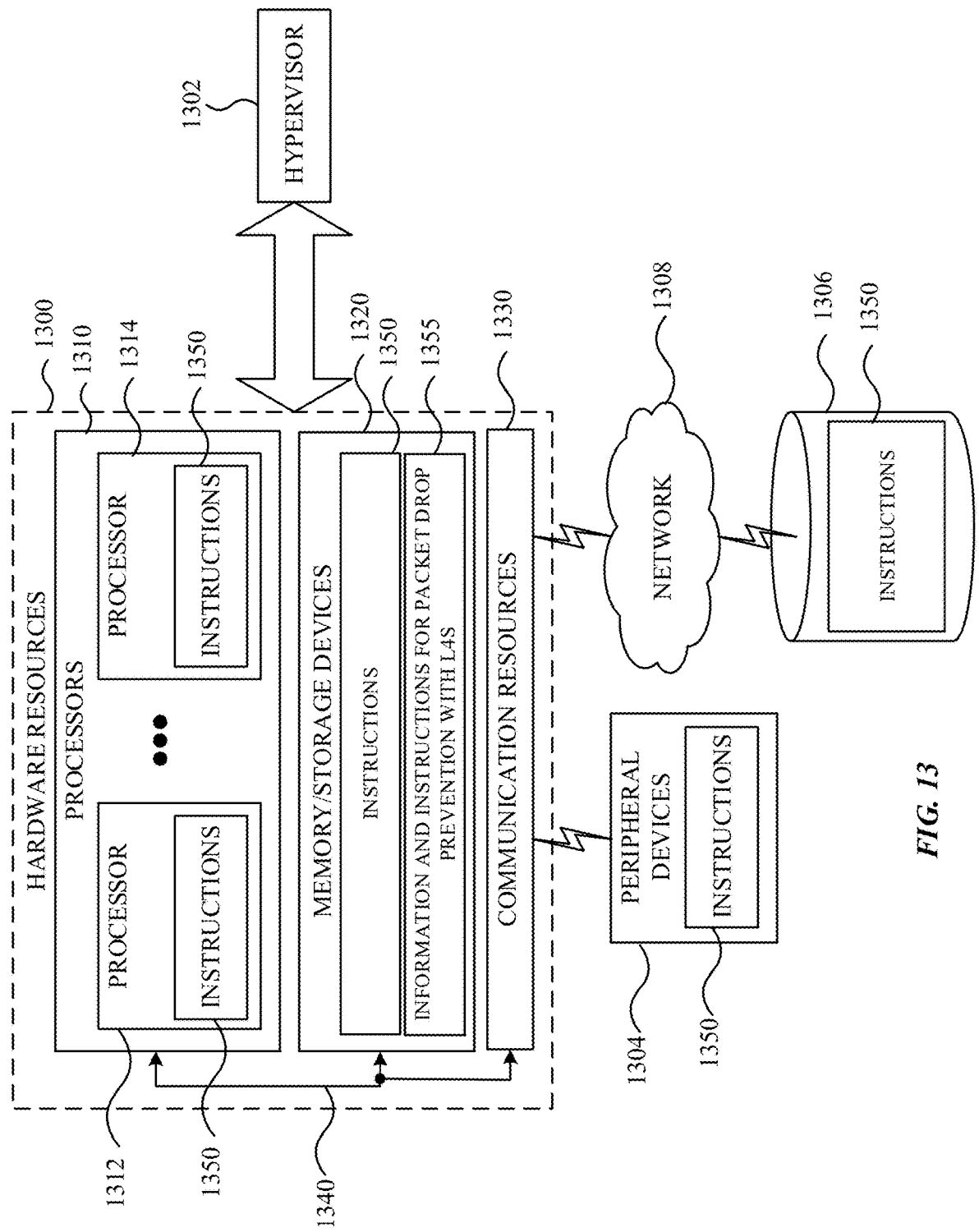
FIG. 13 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 13 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which can be communicatively coupled via a bus 1340. For implementations where node virtualization (e.g., NFV) is utilized, a hypervisor can be executed to provide an execution environment for one or more network slices/sub-slices to utilize the hardware resources 1300.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) can include, for example, a processor 1312 and a processor 1314.

The memory/storage devices 1320 can include main memory, disk storage, or any suitable combination thereof. The memory/storage devices 1320 can include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1320 receive and/or store information and instructions 1355 for enabling UE 110, and/or one or more components thereof, to reduce packet loss for L4S traffic. UE 110 can determine whether a base station is capable of supporting LAS traffic and can implement rate adaptation in different ways based on the L4S capabilities of the base station and active queue management (AQM) policies of the base station. In another example, base station 122 can establish a PDU session between UE 110 and a core network that supports L4S. When a packet arrives, base station 122 can determine whether the packet comes from an LAS application or a non-LAS application. For L4S applications, when the base station detects congestion above a congestion threshold, the base station can mark the packet as CE. This can cause a receiving UE 110 to provide congestion feedback to the sending UE 110, and the sending UE 110 can determine whether and how to apply rate adaptation. For non-LAS applications, the base station can tear down the PDU session and establish a new PDU session over a different network slice (e.g., a network slice that does not support LAS traffic). UE 110 and the base station 122 can use the new PDU session for the non-LAS traffic. As such, UE 110 can reduce packet loss with L4S by adapting to base station LAS capabilities, and the base station 122 can reduce packet loss for L4S traffic by ensuring that traffic is matched with an appropriate PDU session and network slice. These and many other features and examples are described herein.

The communication resources 1330 can include interconnection or network interface components or other suitable devices to communicate with one or more peripheral devices 1304 or one or more databases 1306 via a network 1308. For example, the communication resources 1330 can include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1350 can comprise software, a program, an application, an applet, an app, or other executable code for causing at least any of the processors 1310 to perform any one or more of the methodologies discussed herein. The instructions 1350 can reside, completely or partially, within at least one of the processors 1310 (e.g., within the processor's cache memory), the memory/storage devices 1320, or any suitable combination thereof. Furthermore, any portion of the instructions 1350 can be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Examples and/or implementations herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which can also include one or more of the examples described herein, base station can comprise a memory; and one or more processors configured to, when executing instructions stored in the memory, cause the base station to: receive, from a user equipment (UE), a packet associated with an application of the UE and corresponding to a first low latency protocol data unit (PDU) session configured to support low latency, low loss, scalable throughput (L4S) traffic; determine, based on the packet, whether the application is capable of LAS; when the application is capable of LAS, forward the packet via the first PDU session of the low latency; and when the application is not capable of L4S, establish second PDU session configured to support non-LAS traffic, and forward the packet via the second PDU session.

In example 2, which can also include one or more of the examples described herein, the first PDN session corresponds to a first low latency slice, and the second PDN session corresponds to a second low latency slice.

In example 3, which can also include one or more of the examples described herein, the first low latency slice is associated with a first 5th generation (5G) quality of service (QOS) indicator (5QI), and the second low latency slice is associated with a with a second a 5QI, the first 5QI being different than the second 5QI.

In example 4, which can also include one or more of the examples described herein, the first 5QI comprises one of: a 5QI of 80 or 130; and the second 5GQ comprises one of: a 5QO of 7, 8, or 9.

In example 5, which can also include one or more of the examples described herein, the application is determined to be capable of L4S when the packet comprises an explicit congestion notification (ECN) capable transport (ECT) of 1 (ECT(1)), and the application is determined to not be capable of LAS when the packet comprises an ETC of 0 (ETC(0).

In example 6, which can also include one or more of the examples described herein, when the application is not capable of LAS, the one or more processors are configured to cause the base station to: teardown the first low latency slice.

In example 7, which can also include one or more of the examples described herein, the one or more processors are configured to cause the base station to: modify the packet to indicate congestion experienced (CE) in response to detecting a latency that exceeds a latency threshold.

In example 8, which can also include one or more of the examples described herein, latency comprises an amount of time that the packet spends in a queue of the base station, and the latency threshold comprises a specified amount of time.

In example 9, which can also include one or more of the examples described herein, the application is capable of LAS comprises the application being configured to implement rate adjustment for L4S traffic.

In example 10, which can also include one or more of the examples described herein, the rate adjustment for L4S traffic comprises reducing a rate of LAS traffic in repones to the LAS traffic experiencing congestion.

In example 11, which can also include one or more of the examples described herein, the rate adjustment for L4S traffic comprises increasing a rate of LAS traffic in repones to the LAS traffic failing to make use of available data radio bearers (DRBs) allocated for the LAS traffic.

In example 12, which can also include one or more of the examples described herein, establishing the second PDU session comprises modifying the first PDU session to be a non-LAS PDU session.

In example 13, which can also include one or more of the examples described herein, baseband circuitry can comprise a memory; and one or more processors configured to, when executing instructions stored in the memory, cause the baseband circuitry to: receive, via an interface with an application processor, a packet comprising an indication of whether an application associated with the packet is capable of low latency, low loss, scalable throughput (LAS); send, via an interface with radio frequency (RF) circuitry, the packet associated with the application, the packet being further associated with a first low latency protocol data unit (PDU) session of a slice; when an indication of a network slice teardown and a PDU session modification is received, implement rate adaption, for data traffic associated with the application, according to a lesser rate adaptation threshold; and when the indication of the network slice teardown and the PDU session modification is not received, implement rate adaptation, for data traffic associated with the application, according to a greater rate adaptation threshold.

In example 14, which can also include one or more of the examples described herein, the indication of the network slice teardown and the PDU session modification is not received when: the packet comprises an indication that the application is capable of low latency, low loss, scalable throughput (LAS); and the PDU session and the slice support L4S.

In example 15, which can also include one or more of the examples described herein, the indication of the network slice teardown and the PDU session modification is received when: the packet comprises an indication that the application is not capable of low latency, low loss, scalable throughput (L4S); and the PDU session and the slice support L4S.

In example 16, which can also include one or more of the examples described herein, the data traffic associated with the application is communicated via another PDU session and another slice configured for non-LAS traffic.

In example 17, which can also include one or more of the examples described herein, the lesser rate adaptation threshold comprises a smaller amount of latency functioning as a trigger for rate adaptation, and the greater rate adaptation threshold comprises a larger amount of latency functioning as a trigger for rate adaptation.

In example 18, which can also include one or more of the examples described herein, an amount of rate adaptation is based on a latency associated with data traffic of the application.

In example 19, which can also include one or more of the examples described herein, an amount of rate adaptation is based on at least one packet being marked as congestion experienced (CE).

In example 20, which can also include one or more of the examples described herein, implementing rate adaption comprises sending an indication, to the interface with the application processor, to implement rate adaption at the application processor.

In example 21, which can also include one or more of the examples described herein, implementing rate adaption comprises implementing rate adaption at the baseband processor, and sending an indication, to the interface with the application processor, to implement rate adaptation at the application processor.

In example 22, which can also include one or more of the examples described herein, the one or more processors are configured to cause the baseband circuitry to: in response to receiving a packet not marked as congestion experienced (CE). receive another packet, or receive a notification of a PDU session modification and teardown.

In example 23, which can also include one or more of the examples described herein, a user device (UE) can comprise: a memory; and one or more processors configured to, when executing instructions stored in the memory, cause the UE to: receive a packet comprising an indication of whether an application associated with the packet is capable of low latency, low loss, scalable throughput (L4S); send the packet associated with the application, the packet being further associated with a first low latency protocol data unit (PDU) session of a slice; when an indication of a network slice teardown and a PDU session modification is received, implement rate adaption, for data traffic associated with the application, according to a lesser rate adaptation threshold; and when the indication of the network slice teardown and the PDU session modification is not received, implement rate adaptation, for data traffic associated with the application, according to a greater rate adaptation threshold.

In example 24, which can also include one or more of the examples described herein, the one or more processors are configured to cause the UE to: indicate whether the application supports L4S by including an LAS capability value in a connection request to a receiving UE.

In example 25, which can also include one or more of the examples described herein, a method, performed by a base station, can comprise: receiving, from a user equipment (UE), a packet associated with an application of the UE and corresponding to a first low latency protocol data unit (PDU) session of a first slice configured to support low latency, low loss, scalable throughput (L4S) traffic; determining, based on the packet, whether the application is capable of LAS; when the application is capable of LAS, forwarding the packet via the first PDU session of the low latency; and when the application is not capable of L4S, establishing second PDU session and a second slice configured to support non-LAS traffic, and forwarding the packet via the second PDU session of the second slice.

In example 26, which can also include one or more of the examples described herein, a method, perfumed by baseband circuitry, can comprise: receiving, via an interface with an application processor, a packet comprising an indication of whether an application associated with the packet is capable of low latency, low loss, scalable throughput (L4S); sending, via an interface with radio frequency (RF) circuitry, the packet associated with the application, the packet being further associated with a first low latency protocol data unit (PDU) session of a network slice; when an indication of a network slice teardown and a PDU session modification is received, implementing rate adaption, for data traffic associated with the application, according to a lesser rate adaptation threshold; and when the indication of the network slice teardown and the PDU session modification is not received, implementing rate adaptation, for data traffic associated with the application, according to a greater rate adaptation threshold.

In example 27, which can also include one or more of the examples described herein, a method, performed by a user equipment (UE), can comprise: receiving a packet comprising an indication of whether an application associated with the packet is capable of low latency, low loss, scalable throughput (LAS); sending the packet associated with the application, the packet being further associated with a first low latency protocol data unit (PDU) session of a network slice; when an indication of a network slice teardown and a PDU session modification is received, implementing rate adaption, for data traffic associated with the application, according to a lesser rate adaptation threshold; and when the indication of the network slice teardown and the PDU session modification is not received, implementing rate adaptation, for data traffic associated with the application, according to a greater rate adaptation threshold.

The examples discussed above also extend to method, computer-readable medium, and means-plus-function claims and implementations, an of which can include one or more of the features or operations of any one or combination of the examples mentioned above.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature can have been disclosed with respect to only one of several implementations, such feature can be combined with one or more other features of the other implementations as can be desired and advantageous for any given application.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including," "includes," "having," "has." "with," or variants thereof are used in either the detailed description or the claims, such terms are intended to be inclusive in a manner similar to the term "comprising." Additionally, in situations wherein one or more numbered items are discussed (e.g., a "first X," a "second X," etc.), in general the one or more numbered items can be distinct, or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and managed to minimize risks of unintentional or unauthorized access or use, and the nature of authorized use should be clearly indicated to users.

What is claimed is:

1. A base station, comprising:
   a memory; and
   one or more processors configured to, when executing instructions stored in the memory, cause the base station to:
   receive, from a user equipment (UE), a packet associated with an application of the UE and corresponding to a first low latency protocol data unit (PDU) session configured to support low latency, low loss, scalable throughput (LAS) traffic;
   determine, based on the packet, whether the application is capable of LAS;
   when the application is capable of LAS,
      forward the packet via the first PDU session of the low latency; and
   when the application is not capable of LAS,
      establish second PDU session configured to support non-LAS traffic, and
      forward the packet via the second PDU session.

2. The base station of claim 1, wherein the first PDN session corresponds to a first low latency slice, and the second PDN session corresponds to a second low latency slice.

3. The base station of claim 2, wherein the first low latency slice is associated with a first 5th generation (5G) quality of service (QOS) indicator (5QI), and the second low latency slice is associated with a with a second a 5QI, the first 5QI being different than the second 5QI.

4. The base station of claim 3, wherein the first 5QI comprises one of: a 5QI of 80 or 130; and the second 5GQ comprises one of: a 5QO of 7, 8, or 9.

5. The base station of claim 1, wherein: the application is determined to be capable of LAS when the packet comprises an explicit congestion notification (ECN) capable transport (ECT) of 1 (ECT(1)), and the application is determined to not be capable of LAS when the packet comprises an ETC of 0 (ETC(0).

6. The base station of claim 2, wherein, when the application is not capable of LAS, the one or more processors are configured to cause the base station to: teardown the first low latency slice.

7. The base station of claim 1, wherein the one or more processors are configured to cause the base station to:

modify the packet to indicate congestion experienced (CE) in response to detecting a latency that exceeds a latency threshold.

8. The base station of claim 7, wherein the latency comprises an amount of time that the packet spends in a queue of the base station, and the latency threshold comprises a specified amount of time.

9. The base station of claim 1, wherein the application is capable of LAS comprises the application being configured to implement rate adjustment for LAS traffic.

10. The base station of claim 9, wherein the rate adjustment for LAS traffic comprises reducing a rate of LAS traffic in repones to the LAS traffic experiencing congestion.

11. The base station of claim 9, wherein the rate adjustment for LAS traffic comprises increasing a rate of LAS traffic in repones to the LAS traffic failing to make use of available data radio bearers (DRBs) allocated for the LAS traffic.

12. The base station of claim 1, wherein establishing the second PDU session comprises modifying the first PDU session to be a non-LAS PDU session.

13. Baseband circuitry, comprising:
a memory; and
one or more processors configured to, when executing instructions stored in the memory, cause the baseband circuitry to:
receive, via an interface with an application processor, a packet comprising an indication of whether an application associated with the packet is capable of low latency, low loss, scalable throughput (LAS);
send, via an interface with radio frequency (RF) circuitry, the packet associated with the application, the packet being further associated with a first low latency protocol data unit (PDU) session of a slice;
when an indication of a network slice teardown and a PDU session modification is received,
implement rate adaption, for data traffic associated with the application, according to a lesser rate adaptation threshold; and
when the indication of the network slice teardown and the PDU session modification is not received,
implement rate adaptation, for data traffic associated with the application, according to a greater rate adaptation threshold.

14. The baseband circuitry of claim 13, wherein the indication of the network slice teardown and the PDU session modification is not received when:
the packet comprises an indication that the application is capable of low latency, low loss, scalable throughput (LAS); and
the PDU session and the slice support LAS.

15. The baseband circuitry of claim 13, wherein the indication of the network slice teardown and the PDU session modification is received when:
the packet comprises an indication that the application is not capable of low latency, low loss, scalable throughput (LAS); and
the PDU session and the slice support LAS.

16. The baseband circuitry of claim 15, wherein the data traffic associated with the application is communicated via another PDU session and another slice configured for non-LAS traffic.

17. The baseband circuitry of claim 13, wherein the lesser rate adaptation threshold comprises a smaller amount of latency functioning as a trigger for rate adaptation, and the greater rate adaptation threshold comprises a larger amount of latency functioning as a trigger for rate adaptation.

18. The baseband circuitry of claim 13, wherein an amount of rate adaptation is based on a latency associated with data traffic of the application.

19. The baseband circuitry of claim 13, wherein an amount of rate adaptation is based on at least one packet being marked as congestion experienced (CE).

20. The baseband circuitry of claim 13, wherein implementing rate adaption comprises sending an indication, to the interface with the application processor, to implement rate adaption at the application processor.

* * * * *